(12) United States Patent
Aoshima

(10) Patent No.: US 7,899,317 B2
(45) Date of Patent: Mar. 1, 2011

(54) DRIVING DEVICE, OPTICAL APPARATUS, AND IMAGE PICKUP APPARATUS

(75) Inventor: Chikara Aoshima, Zama (JP)

(73) Assignee: Canon Kabushiki Kaisha (JP)

( * ) Notice: Subject to any disclaimer, the term of this patent is extended or adjusted under 35 U.S.C. 154(b) by 691 days.

(21) Appl. No.: 11/255,522

(22) Filed: Oct. 21, 2005

(65) Prior Publication Data
US 2006/0088304 A1    Apr. 27, 2006

(30) Foreign Application Priority Data

Oct. 21, 2004  (JP)  .............................. 2004-307248
May 17, 2005  (JP)  .............................. 2005-144197

(51) Int. Cl.
*G03B 13/34*   (2006.01)

(52) U.S. Cl. .......................... 396/133; 359/824; 310/12
(58) Field of Classification Search .................. 396/85, 396/133; 310/12, 13, 14; 359/694, 824
See application file for complete search history.

(56) References Cited

U.S. PATENT DOCUMENTS

| | | | | | |
|---|---|---|---|---|---|
| 2,409,363 | A | * | 10/1946 | Anton | 451/548 |
| 4,605,286 | A | * | 8/1986 | Sumi | 359/696 |
| 5,231,473 | A | * | 7/1993 | Kawamura et al. | 359/694 |
| 5,283,487 | A | * | 2/1994 | Oki et al. | 310/49 R |
| 5,831,356 | A | * | 11/1998 | Aoshima | 310/49 R |
| 6,077,406 | A | * | 6/2000 | Kawakubo et al. | 204/298.12 |
| 6,317,562 | B1 |   | 11/2001 | Aoshima | |
| 6,417,004 | B1 | * | 7/2002 | Brady et al. | 436/69 |

(Continued)

FOREIGN PATENT DOCUMENTS

CN    1166719 A    12/1997

(Continued)

OTHER PUBLICATIONS

JP 2003-061332 A—machine translation.*

(Continued)

*Primary Examiner*—Clayton E LaBalle
*Assistant Examiner*—Linda B Smith
(74) *Attorney, Agent, or Firm*—Rossi, Kimms & McDowell LLP

(57) ABSTRACT

A driving device which is capable of increasing a driving speed at which an object to be driven is driven, enhancing quietness in driving the object to be driven, and positioning the object to be driven with high accuracy. A hollow cylindrical magnet (1) extends along an optical axis, and a plurality of magnetized parts (1*a* to 1*j*) spirally extend along the outer peripheral surface of the magnet. A first yoke (2), a second yoke (3), a third yoke (7), and a fourth yoke (8) are formed of a soft magnetic material, and each of the yokes has five magnetic pole teeth (2*a* to 2*e*, 3*a* to 3*e*, 7*a* to 7*e*, or 8*a* to 8*e*) each disposed in opposed relation to a corresponding one of the magnetized parts of the magnet. A lens holder (12) holds the object to be driven and supports the magnet such that the magnet is movable along the optical axis. First and second coils (5, 10) for magnetizing the first and second yokes, respectively, are energized to move the magnet along the lens holder in the direction along the predetermined axis to thereby drive the object to be driven.

4 Claims, 16 Drawing Sheets

U.S. PATENT DOCUMENTS

| | | | |
|---|---|---|---|
| 6,472,792 B1 * | 10/2002 | Jack et al. | 310/254 |
| 6,561,343 B2 * | 5/2003 | Miyauchi et al. | 198/619 |
| 6,667,677 B2 * | 12/2003 | Yajima et al. | 335/220 |
| 6,849,970 B2 * | 2/2005 | Watanabe | 310/12.22 |
| 6,909,208 B2 * | 6/2005 | Suzuki et al. | 310/49.13 |
| 7,034,424 B2 * | 4/2006 | Kometani et al. | 310/156.47 |
| 7,378,763 B2 * | 5/2008 | Jack et al. | 310/12 |
| 2001/0028624 A1 * | 10/2001 | Ijima et al. | 369/112.23 |
| 2003/0040671 A1 * | 2/2003 | Somogyi et al. | 600/424 |
| 2004/0140796 A1 * | 7/2004 | Okubo et al. | 324/207.25 |

FOREIGN PATENT DOCUMENTS

| | | | |
|---|---|---|---|
| JP | 60-219959 A | | 11/1985 |
| JP | 60219959 A | * | 11/1985 |
| JP | 4-93807 A | | 3/1992 |
| JP | 7-075321 A | | 3/1995 |
| JP | 10-257751 A | | 9/1998 |
| JP | 11-055925 A | | 2/1999 |
| JP | 11-190815 A | | 7/1999 |
| JP | 2003061332 A | * | 2/2003 |
| JP | 2006174528 A | * | 6/2006 |

OTHER PUBLICATIONS

JP S60-219959—human translation.*

* cited by examiner

DRIVING DEVICE, OPTICAL APPARATUS, AND IMAGE PICKUP APPARATUS

BACKGROUND OF THE INVENTION

1. Field of the Invention

The present invention relates to a driving device for electromagnetically driving an object to be driven, and an optical apparatus and an image pickup apparatus which are equipped with the driving device.

2. Description of the Related Art

A lens driving device for cameras has conventionally been proposed e.g. in Japanese Laid-Open Patent Publication (Kokai) No. H11-190815, in which a small cylindrical stepping motor is disposed parallel with a lens, and the stepping motor drives the lens by means of a lead screw or the like.

Further, a lens driving device using a voice coil actuator has been disclosed e.g. in Japanese Laid-Open Patent Publication No. H04-093807. The voice coil actuator is provided with one of a magnet and a coil fixed to a support frame that supports a lens group, and the other to a lens barrel, to thereby drive a zoom lens. In this voice coil actuator, the coil is one-phase controlled, and electric current is applied to the coil in the normal direction or in the reverse direction while detecting the position of the lens by a position sensor. In this way, the lens is positioned in a desired position.

In the former driving device, however, noise is generated by sliding contact between a member held in mesh with the lead screw to function as a female thread and the surface of the lead screw, and hence when the driving device is used e.g. in a video camera, the sliding noise can be recorded as untoward noise. Further, if the lead screw is deformed, the deformation can be transmitted to the member serving as the female thread to cause the member to displace the lens in a direction orthogonal to the optical axis resulting in degraded accuracy in lens positioning.

Furthermore, when the former driving device is used for driving the zoom lens of a video camera, the driving speed at which the zoom lens is driven is slow, and hence it takes time to drive the zoom lens to a position where a desired focal length is obtained, which results in degraded quick shooting performance.

The latter driving device, i.e. the driving device using a voice coil actuator, is superior to the former driving device in zoom speed, quietness, and accuracy in lens positioning. However, in this driving device, the friction coefficients of drive guide parts vary due to changes in the operating environment and aging. Further, when shooting is performed in an unexpected shooting posture, the lens cannot be positioned accurately.

Moreover, when the camera is used in an unexpected shooting posture, the lens cannot be accurately controlled to a desired position, and in worst cases suffers from vibration, which hinders the lens from being stopped at a correct position.

SUMMARY OF THE INVENTION

It is an object of the present invention to provide a driving device which is capable of increasing a driving speed at which an object to be driven, such as a lens, is driven, enhancing quietness in driving the object to be driven, and positioning the object to be driven with high accuracy, and an optical apparatus and an image pickup apparatus which are equipped with the driving device.

To attain the above object, in a first aspect of the present invention, there is provided a driving device for driving an object to be driven, comprising a columnar magnet extending in a direction along a predetermined axis, the magnet having a plurality of magnetized parts spirally extending along an outer peripheral surface thereof, first, second, third, and fourth yokes formed of a soft magnetic material, each of the yokes having at least one magnetic pole tooth disposed in opposed relation to a corresponding one of the magnetized parts of the magnet, a first coil for magnetizing the first yoke and the second yoke, a second coil for magnetizing the third yoke and the fourth yoke, and a holding member that holds the object to be driven and supports the magnet such that the magnet is movable in the direction along the predetermined axis, wherein the first and second coils are energized to move the magnet along the holding member in the direction along the predetermined axis to thereby drive the object to be driven.

With the construction of the first aspect of the present invention, it is possible to increase a driving speed at which an object to be driven, such as a lens, is driven, enhance quietness in driving the object to be driven, and position the object to be driven with high accuracy.

Preferably, the driving device comprises a preventive member that prevents the magnet from rotating about the predetermined axis.

Preferably, the magnet has a shape of a hollow cylinder having a hollow part formed therethrough, and the holding member is inserted through the hollow part of the magnet.

Preferably, the magnet is fixed to the object to be driven.

To attain the above object, in a second aspect of the present invention, there is provided a driving device for driving an object to be driven, comprising a columnar magnet extending in a direction along a predetermined axis, the magnet having a plurality of magnetized parts spirally extending along an outer peripheral surface thereof, and one end, first, second, third, and fourth yokes formed of a soft magnetic material, each of the yokes having at least one magnetic pole tooth disposed in opposed relation to a corresponding one of the magnetized parts of the magnet, a first coil for magnetizing the first yoke and the second yoke, a second coil for magnetizing the third yoke and the fourth yoke, a base plate to which the one end of the magnet is fixed, a combining member that integrally combines the first, second, third, and fourth yokes, and the first and second coils, and a holding member that holds the object to be driven and supports the combining member such that the combining member is movable in the direction along the predetermined axis, wherein the first and second coils are energized to move the magnet along the holding member in the direction along the predetermined axis to thereby drive the object to be driven.

With the construction of the second aspect of the present invention, it is possible to increase a driving speed at which an object to be driven, such as a lens, is driven, enhance quietness in driving the object to be driven, and position the object to be driven with high accuracy.

Preferably, the driving device comprises a preventive member that prevents the combining member from rotating about the predetermined axis.

Preferably, the combining member is fixed to the object to be driven.

To attain the above object, in a third aspect of the present invention, there is provided an optical apparatus comprising a driving device as one of those described above.

To attain the above object, in a fourth aspect of the present invention, there is provided a driving device for driving an object to be driven, comprising a magnet to which the object to be driven is fixed, the magnet having at least one magnetized part spirally extending along an outer peripheral surface thereof, a first stator unit comprising a first yoke formed of a soft magnetic material and having at least one magnetic pole tooth, and a first coil for magnetizing the first yoke, and a second stator unit comprising a second yoke formed of a soft magnetic material and having at least one magnetic pole tooth, and a second coil for magnetizing the second yoke, wherein the magnet is disposed between the first stator unit and the second stator unit, and the magnetic pole tooth of each of the first and second yokes spirally extends in opposed relation to the magnetized part.

Preferably, the driving device further comprises a first bobbin around which the first coil is wound, and a second bobbin around which the second coil is wound, and the first yoke is formed of a pair of yokes fixed to the first bobbin, and the second yoke is formed of a pair of yokes fixed to the second bobbin.

Preferably, the object to be driven is a lens, and the driving device further comprises a lens holding member holding the lens, a fixing member that fixes the first and second stator units, a guide member fixed to the fixing member, for guiding the lens holding member in a manner slidable along an optical axis of the lens, and a rotation preventive member fixed to the fixing member and engaged with the lens holding member, for preventing rotation of the lens holding member.

With the construction of the fourth aspect of the present invention, the magnet is disposed between the first and second stator units, and the magnetic pole teeth of the first and second yokes are each in the form of a spiral and opposed to respective corresponding ones of the magnetized parts of the magnet. Further, a lens holding member holding the lens as the object to be driven is made slidable in a direction in which the optical axis extends, but its rotation is inhibited. Thus, reduction of driving time required for driving the lens, enhancement of quietness in driving the lens, and stable and accurate lens positioning (stability of a stop position) can be achieved.

To attain the above object, in a fifth aspect of the present invention, there is provided an image pickup apparatus comprising a driving device as one of those described hereinabove.

The above and other objects, features, and advantages of the present invention will become more apparent from the following detailed description taken in conjunction with the following drawings.

DETAILED DESCRIPTION OF THE PREFERRED EMBODIMENTS

The present invention will now be described in detail below with reference to the drawings showing preferred embodiments thereof.

First, a description will be given of a first embodiment of the present invention.

Figure 1:
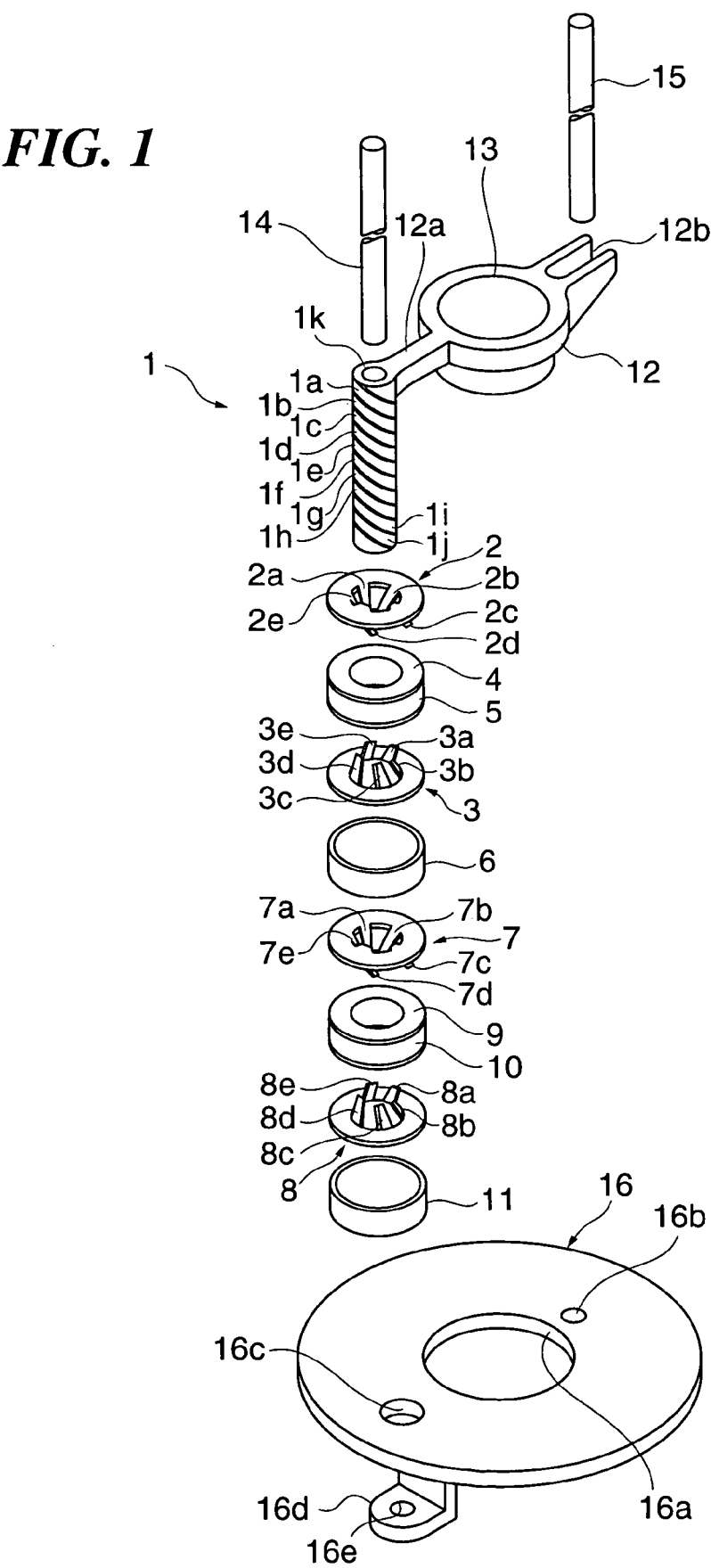
FIG. 1 is an exploded perspective view of a driving device according to a first embodiment of the present invention.
Figure 2:
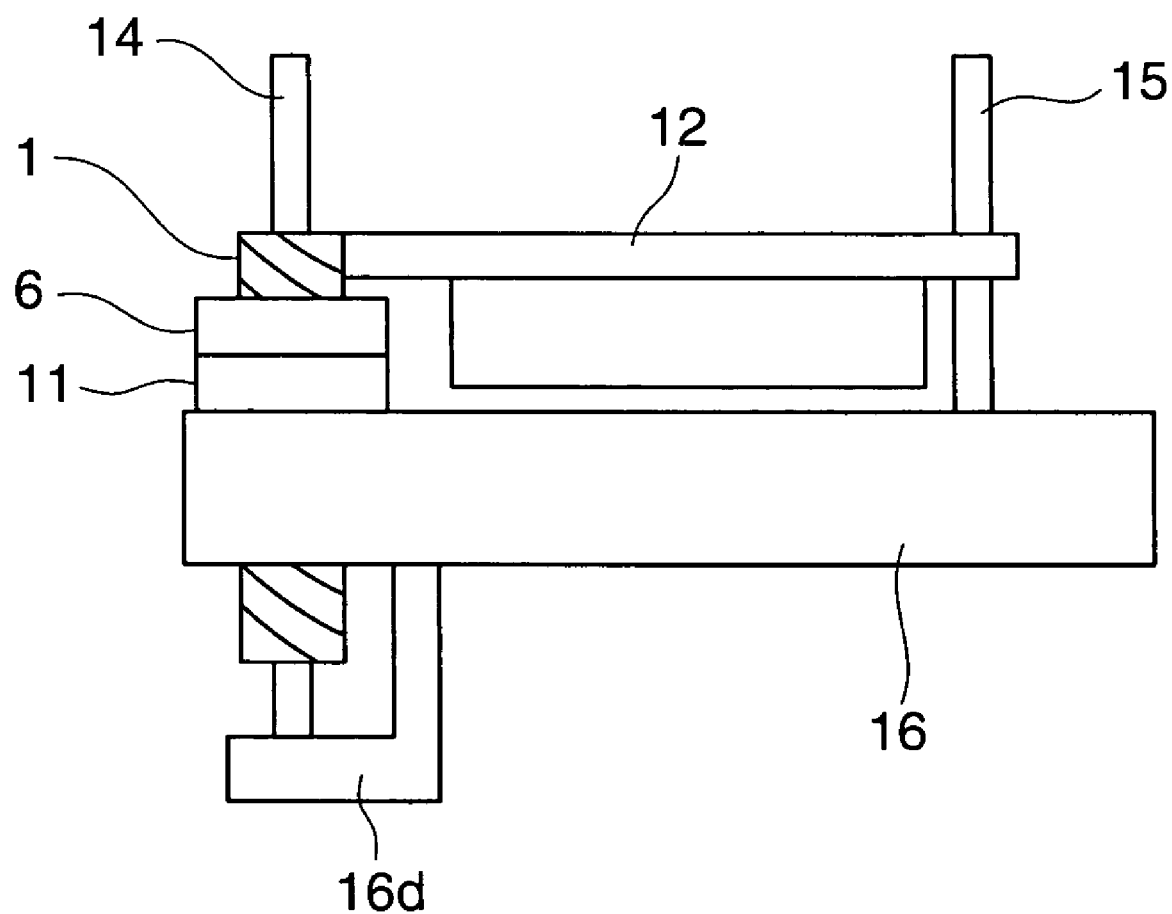
FIG. 2 is a side view of the driving device.

FIG. 1 is an exploded perspective view of a driving device according to the first embodiment of the present invention. FIG. 2 is a side view of the driving device, FIG. 3 a longitudinal cross-sectional view of essential parts of the driving device, FIG. 4 a cross-sectional view taken on line C-C in FIG. 3, and FIG. 5 a developed plan view showing the relationship between yokes and a magnet. In the following description, it is assumed that the driving device of the present embodiment is used as a driving device for driving a lens of a camera.

Figure 4:
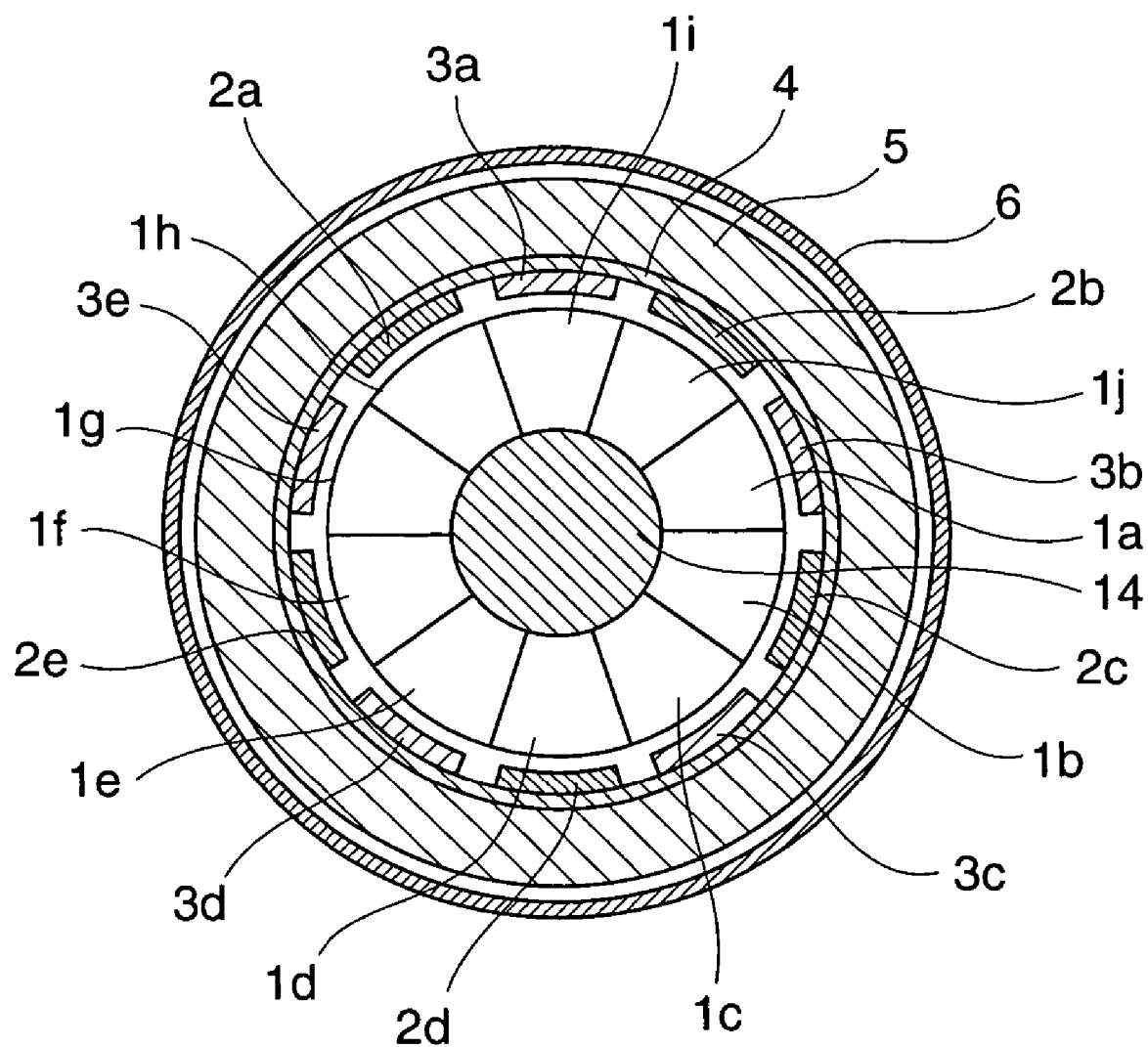
FIG. 4 is a cross-sectional view taken on line C-C in FIG. 3.

As shown in FIG. 1, the driving device is comprised of a hollow cylindrical magnet 1, a first yoke 2, a second yoke 3, a third yoke 7, and a fourth yoke 8. The magnet 1 has an outer peripheral surface thereof formed with a plurality of magnetized parts 1a, 1b, 1c, 1d, 1e, 1f, 1g, 1h, 1i, and 1j. The magnetized parts 1a to 1j spirally extend along the outer peripheral surface of the magnet 1 and adjacent to one another. Among the magnetized parts 1a to 1j, the magnetized parts 1a, 1c, 1e, 1g, and 1i are S magnetized, while the magnetized parts 1b, 1d, 1f, 1h, and 1j are N magnetized. In the present embodiment, the magnet 1 has ten magnetized parts, and in a transverse cross section of the magnet 1, the ten magnetized parts are circumferentially arranged alternately as N and S poles as shown in FIG. 4. It is to be understood that the number of magnetized parts (poles) is not limited to the above number.

The magnet 1 has a hollow part 1k (guide part) axially formed therethrough, and a guide bar 14, referred to hereinafter, is slidably fitted in the hollow part 1k. This enables the magnet 1 to move along its axis while being guided by the guide bar 14.

The first yoke 2 is formed of a soft magnetic material, and has five spiral magnetic pole teeth 2a, 2b, 2c, 2d, and 2e. If the number of the magnetized poles of the magnet 1 is equal to N, the magnetic pole teeth are arranged at phase intervals of $4\pi/N$ (rad) in terms of mechanical angle, i.e. at phase intervals of $2\pi$ (rad) in terms of electrical angle, and the number of the magnetic pole teeth is equal to N/2. In the present embodiment, since N is equal to 10, the magnetic pole teeth are arranged at phase intervals of $2\pi/5$ (rad), and the number of the magnetic pole teeth is equal to 5. The magnetic pole teeth 2a, 2b, 2c, 2d, and 2e are opposed to respective corresponding ones of the magnetized parts of the magnet 1.

Figure 5:
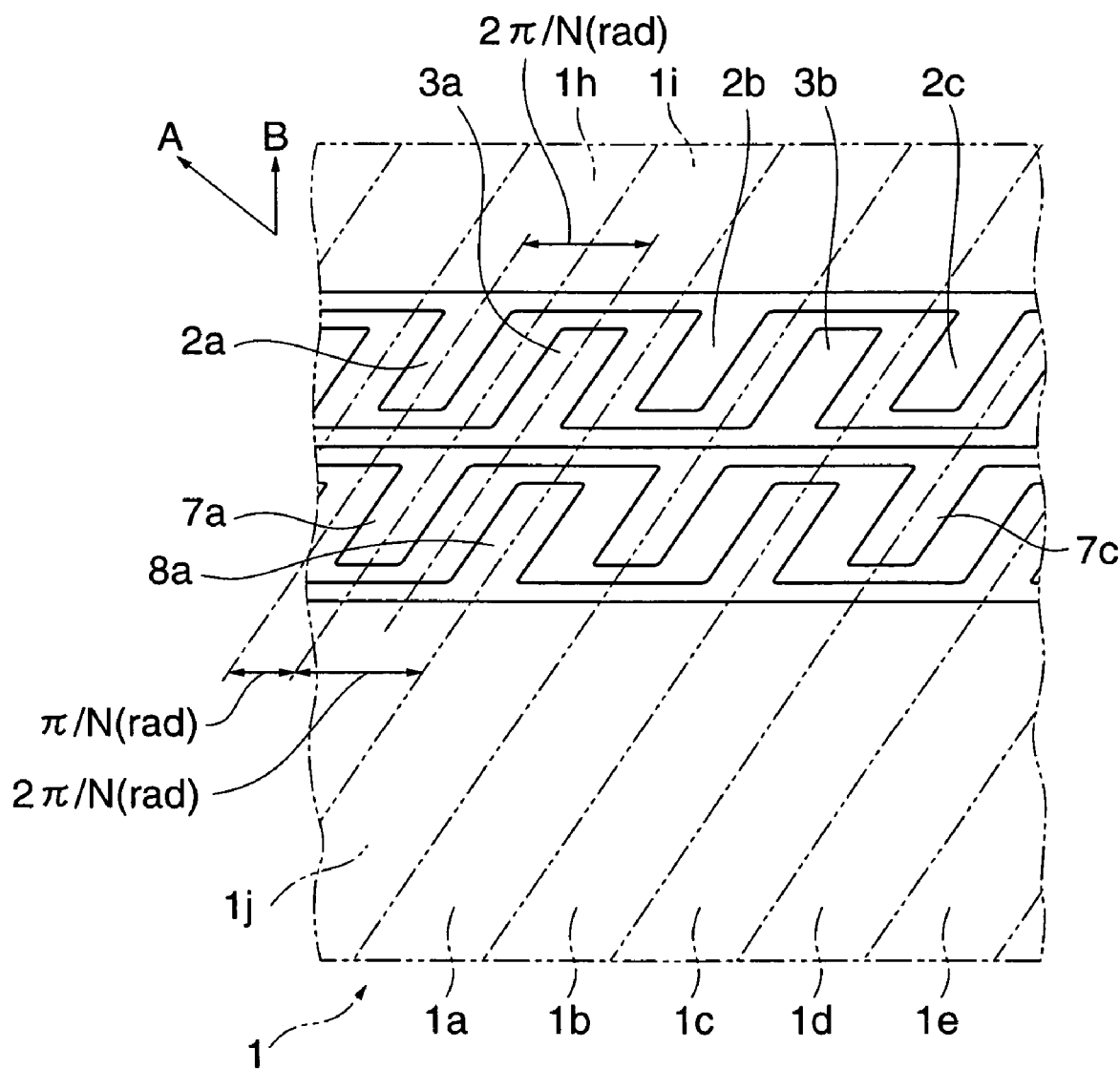
FIG. 5 is a developed plan view showing the relationship between yokes and a magnet.

The second yoke 3 is formed of a soft magnetic material, and has five spiral magnetic pole teeth 3a, 3b, 3c, 3d, and 3e. The number of the magnetic pole teeth of the second yoke 3 is determined similarly to that of the magnetic pole teeth of the first yoke 2, and the magnetic pole teeth 3a, 3b, 3c, 3d, and 3e are opposed to respective corresponding ones of the magnetized parts of the magnet 1. Further, as shown in FIG. 5, the magnetic pole teeth 3a, 3b, 3c, 3d, and 3e are arranged in a manner shifted in phase from the magnetic pole teeth 2a, 2b, 2c, 2d, and 2e, respectively, by $2\pi/N$ (rad) in terms of mechanical angle ($\pi$ (rad) in terms of electrical angle).

A first bobbin 4 is disposed between the first yoke 2 and the second yoke 3. The first bobbin 4 is formed of a non-conductive material, such as plastic, and a first coil 5 made of a lead wire is wound around the first bobbin 4. When an electric current is applied to the first coil 5, the magnetic pole teeth 2a to 2e of the first yoke 2 and the magnetic pole teeth 3a to 3e of the second yoke 3 are magnetized to have respective predetermined polarities.

The first yoke 2 and the second yoke 3 are fixed to a first outer cover 6. The first outer cover 6 is formed of a soft magnetic material. The first outer cover 6 not only covers the first bobbin 4 and the first coil 5, but also magnetically couples the first yoke 2 and the second yoke 3 to each other for relative positioning of the two yokes 2 and 3.

The first yoke 2, the second yoke 3, the first bobbin 4, the first coil 5, and the first outer cover 6 form a first stator.

The third yoke 7 is formed of a soft magnetic material, and has five spiral magnetic pole teeth 7a, 7b, 7c, 7d, and 7e. The number of the magnetic pole teeth of the third yoke 7 is determined similarly to that of the magnetic pole teeth of the first yoke 2, and the magnetic pole teeth 7a, 7b, 7c, 7d, and 7e are opposed to respective corresponding ones of the magnetized parts of the magnet 1.

The fourth yoke 8 is formed of a soft magnetic material, and has five spiral magnetic pole teeth 8a, 8b, 8c, 8d, and 8e. The number of the magnetic pole teeth of the fourth yoke 8 is determined similarly to that of the magnetic pole teeth of the first yoke 2, and the magnetic pole teeth 8a, 8b, 8c, 8d, and 8e are opposed to respective corresponding ones of the magnetized parts of the magnet 1. Further, as shown in FIG. 5, the magnetic pole teeth 8a, 8b, 8c, 8d, and 8e are arranged in a manner shifted in phase from the magnetic pole teeth 7a, 7b, 7c, 7d, and 7e, respectively, by $2\pi/N$ (rad) in terms of mechanical angle ($\pi$ (rad) in terms of electrical angle).

A second bobbin 9 is disposed between the third yoke 7 and the fourth yoke 8. The second bobbin 9 is formed of a non-conductive material, such as plastic, and a second coil 10 made of a lead wire is wound around the second bobbin 9. When an electric current is applied to the second coil 10, the magnetic pole teeth 7a to 7e of the third yoke 7 and the magnetic pole teeth 8a to 8e of the fourth yoke 8 are magnetized to have respective predetermined polarities.

The third yoke 7 and the fourth yoke 8 are fixed to a second outer cover 11. The second outer cover 11 is formed of a soft magnetic material. The second outer cover 11 not only covers the second bobbin 9 and the second coil 10, but also magnetically couples the third yoke 7 and the fourth yoke 8 to each other for relative positioning of the two yokes 7 and 8.

The third yoke 7, the fourth yoke 8, the second bobbin 9, the second coil 10, and the second outer cover 11 form a second stator.

When the relationship between the first yoke 2, the second yoke 3, the third yoke 7, and the fourth yoke 8, and the magnetized parts 1a to 1j of the magnet 1 is illustrated in a developed manner, as shown in FIG. 5, the first stator and the second stator are arranged in a manner shifted in phase from each other with respect to the magnetization phase of the magnetized parts of the magnet 1 by $\pi/N$ (rad) in terms of mechanical angle (by $\pi/2$ (rad) in terms of electrical angle i.e.), that is, in the present embodiment, by $\pi/10$ (rad) in terms of mechanical angle, because each of the first stator and the second stator has ten magnetic pole teeth (the magnetic pole teeth 2a to 2e and 3a to 3e of the first stator or the magnetic pole teeth 7a to 7e and 8a to 8e of the second stator). The first stator and the second stator are fixed to each other by a known method, such as welding or bonding.

The magnet 1 has a lens holder 12 attached thereto. The lens holder 12 is formed with an arm 12a and a groove 12b. The lens holder 12 is formed integrally with the magnet 1 with the arm 12a joined to the magnet 1. The lens holder 12 has a lens 13 fixed thereto.

Figure 3:
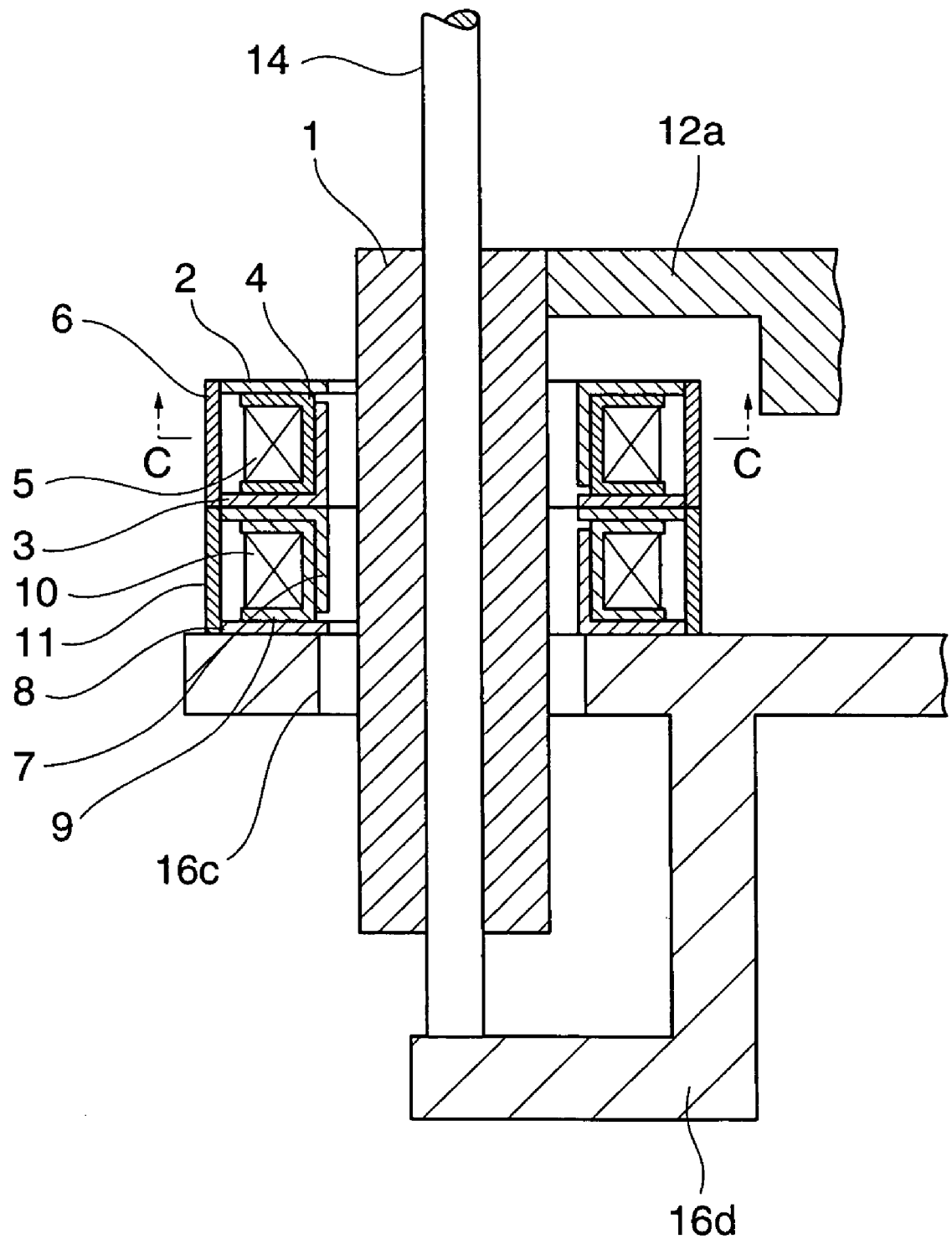
FIG. 3 is a longitudinal cross-sectional view of essential parts of the driving device.

The guide bar 14 is slidably fitted in the hollow part 1k of the magnet 1, as shown in FIG. 3, and the magnet 1 is movably supported by the guide bar 14. The guide bar 14 guides the magnet 1 for axial movement thereof. A shake preventive guide bar 15 is slidably fitted in the groove 12b of the lens holder 12, for preventing the magnet 1 from rotating about its axis. More specifically, the shake preventive guide bar 15 prevents the lens holder 12 and the lens 13 from rotating about the axis of the magnet 1 (i.e. about the guide bar 14).

As shown in FIG. 2, the first stator and the second stator are fixed to a base plate 16. The base plate 16 is formed therein with an opening 16a coaxial with the lens 13, a hole 16c, and a hole 16b and provided with an arm 16d. The opening 16a guides light having passed through the lens 13 toward a camera body, not shown. The arm 16d is formed therein with a hole 16e axially aligned with the hole 16c. The guide bar 14 is inserted through the hole 16c with one end thereof fitted in the hole 16e and fixed thereto. The shake preventive guide bar 15 is secured to the base plate 16 at one end thereof fitted in the hole 16b.

Next, a description will be given of the operation of the driving device.

It is assumed that in a state shown in FIG. 5, the first coil 5 is energized such that the magnetic pole teeth 2a, 2b, 2c, 2d, and 2e of the first yoke 2 are S magnetized, and the magnetic pole teeth 3a, 3b, 3c, 3d, and 3e of the second yoke 3 are N magnetized. When energization of the first coil 5 is interrupted and at the same time the second coil 10 is energized such that the magnetic pole teeth 7a, 7b, 7c, 7d, and 7e of the third yoke 7 are N magnetized, and the magnetic pole teeth 8a, 8b, 8c, 8d, and 8e of the fourth yoke 8 are S magnetized, an electromagnetic force acting in a direction indicated by an arrow A in FIG. 5 is generated in the magnet 1. The electromagnetic force acting in the direction indicated by the arrow A is divided into a component acting in a direction of rotating the magnet 1 and a component acting along the axis of the magnet 1.

Since the shake preventive guide bar 15 prevents the lens holder 12 fixed to the magnet 1 from rotating about the guide bar 14, even when the component of the electromagnetic force generated in the direction indicated by the arrow A, which acts in the direction of rotating the magnet 1, is applied to the magnet 1, the magnet 1 (the lens holder 12 and the lens 13) is not rotated, but moved along the guide bar 14 in a direction indicated by an arrow B in FIG. 5 (i.e. an upward direction as viewed in FIG. 2) by the component acting along the axis of the magnet 1 in the same direction. Then, the magnet 1 is stopped at a position where the magnetized part 1i is opposed to the magnetic pole tooth 7a of the third yoke 7.

Then, when energization of the second coil 10 is interrupted in this state, and at the same time the first coil 5 is energized such that the magnetic pole teeth 2a, 2b, 2c, 2d, and 2e of the first yoke 2 are N magnetized, and the magnetic pole teeth 3a, 3b, 3c, 3d, and 3e of the second yoke 3 are S magnetized, an electromagnetic force acting in the direction indicated by the arrow A is generated again in the magnet 1. In this case as well, even when the component of the electromagnetic force generated in the direction indicated by the arrow A, which acts in the direction of rotating the magnet 1, is applied to the magnet 1, the magnet 1 is not rotated, but moved along the guide bar 14 in the direction indicated by the arrow B (the upward direction as viewed in FIG. 2) by the component acting in the same direction. Then, the magnet 1 is stopped at a position where the magnetized part 1i is opposed to the magnetic pole tooth 2a of the first yoke 2.

Then, when energization of the first coil 5 is interrupted in this state, and at the same time the second coil 10 is energized such that the magnetic pole teeth 7a, 7b, 7c, 7d, and 7e of the third yoke 7 are S magnetized, and the magnetic pole teeth 8a, 8b, 8c, 8d, and 8e of the fourth yoke 8 are N magnetized, an electromagnetic force acting in the direction indicated by the arrow A is generated again in the magnet 1. In this case as well, even when the component of the electromagnetic force generated in the direction indicated by the arrow A, which acts in the direction of rotating the magnet 1, is applied to the magnet 1, the magnet 1 is not rotated, but moved along the guide bar 14 in the direction indicated by the arrow B by the component acting in the same direction. Then, the magnet 1 is stopped at a position where the magnetized part 1j is opposed to the magnetic pole tooth 7a of the third yoke 7.

Then, when energization of the second coil 10 is interrupted in this state, and at the same time the first coil 5 is energized such that the magnetic pole teeth 2a, 2b, 2c, 2d, and 2e of the first yoke 2 are S magnetized, and the magnetic pole teeth 3a, 3b, 3c, 3d, and 3e of the second yoke 3 are N magnetized, an electromagnetic force acting in the direction indicated by the arrow A is generated again in the magnet 1. In this case as well, even when the component of the electromagnetic force generated in the direction indicated by the arrow A, which acts in the direction of rotating the magnet 1, is applied to the magnet 1, the magnet 1 is not rotated, but moved along the guide bar 14 in the direction indicated by the arrow B by the component acting in the same direction. Then, the magnet 1 is stopped at a position where the magnetized part 1j is opposed to the magnetic pole tooth 2a of the first yoke 2.

To move the magnet 1 in the opposite direction to the direction indicated by the arrow B, the coils 5 and 10 are only required to be alternately energized or deenergized in a sequence reverse to the above described sequence.

Thus, the first coil 5 and the second coil 10 are alternately energized or deenergized to switch the polarity of each of the magnetic pole teeth 2a to 2e of the first yoke 2, the magnetic pole teeth 3a to 3e of the second yoke 3, the magnetic pole teeth 7a to 7e of the third yoke 7, and the magnetic pole teeth 8a to 8e of the fourth yoke 8, whereby the magnet 1 (the lens holder 12 and the lens 13) can be moved along the guide bar 14 in the direction indicated by the arrow B or in the opposite direction.

Further, it is possible to carry out micro-step control such that the magnet 1 is stopped at a position corresponding to the magnitude of magnetic forces generated by the first coil 5 and the second coil 10, such as a position where the magnetized parts are not just opposed to respective corresponding ones of the magnetic pole teeth, by controlling the magnitude of electric currents applied to the first coil 5 and the second coil 10. According to this method, the magnet 1 is stably held in a position where it is attracted by the two-phase coils, so that the lens 13 can be positioned more stably and accurately than by the conventional method using a voice coil actuator including a one-phase coil.

Further, according to the present embodiment, the first coil 5 and the second coil 10 are alternately switched for energization to thereby drive the lens holder 12 and the lens 13 along the optical axis by electromagnetic forces. Therefore, as is distinct from the conventional type driving device which rotates a lead screw by a stepping motor to drive the lens along the optical axis, the driving device according to the present embodiment is free from generation of sliding noise and a slow lens driving speed. Further, the driving device according to the present embodiment is capable of performing quiet and high-speed lens driving similarly to the conventional type driving device using a voice coil actuator including a one-phase coil.

Further, in the present embodiment, the hollow cylindrical magnet 1 is used to facilitate assembly of the first yoke 2 and the second yoke 3 and that of the third yoke 7 and the fourth yoke 8. Since each of the yokes 2, 3, 7, and 8 has magnetic pole teeth thereof spirally extending along the outer periphery of the magnet 1, the first yoke 2 and the second yoke 3 can be assembled together by spirally rotating and axially moving the two yokes according to the spiral shape of the magnetic pole teeth. This facilitates assembly of the first yoke 2 and the second yoke 3. This is also the case with the third yoke 7 and the fourth yoke 8.

Furthermore, the use of the driving device of the present embodiment makes it possible to provide a camera which is capable of not only positioning its lens stably with high accuracy, but also performing quiet and high-speed lens driving.

Although in the present embodiment, the hollow part 1k of the magnet 1 is formed as a guide part for the guide bar 14, this is not limitative, but, for example, the lens holder 12 which is movable in unison with the magnet 1 may be formed therein with a guide hole in which the guide bar 14 is slidably fitted.

Next, a second embodiment of the present invention will be described with reference to FIGS. 6 and 7.

Figure 6:
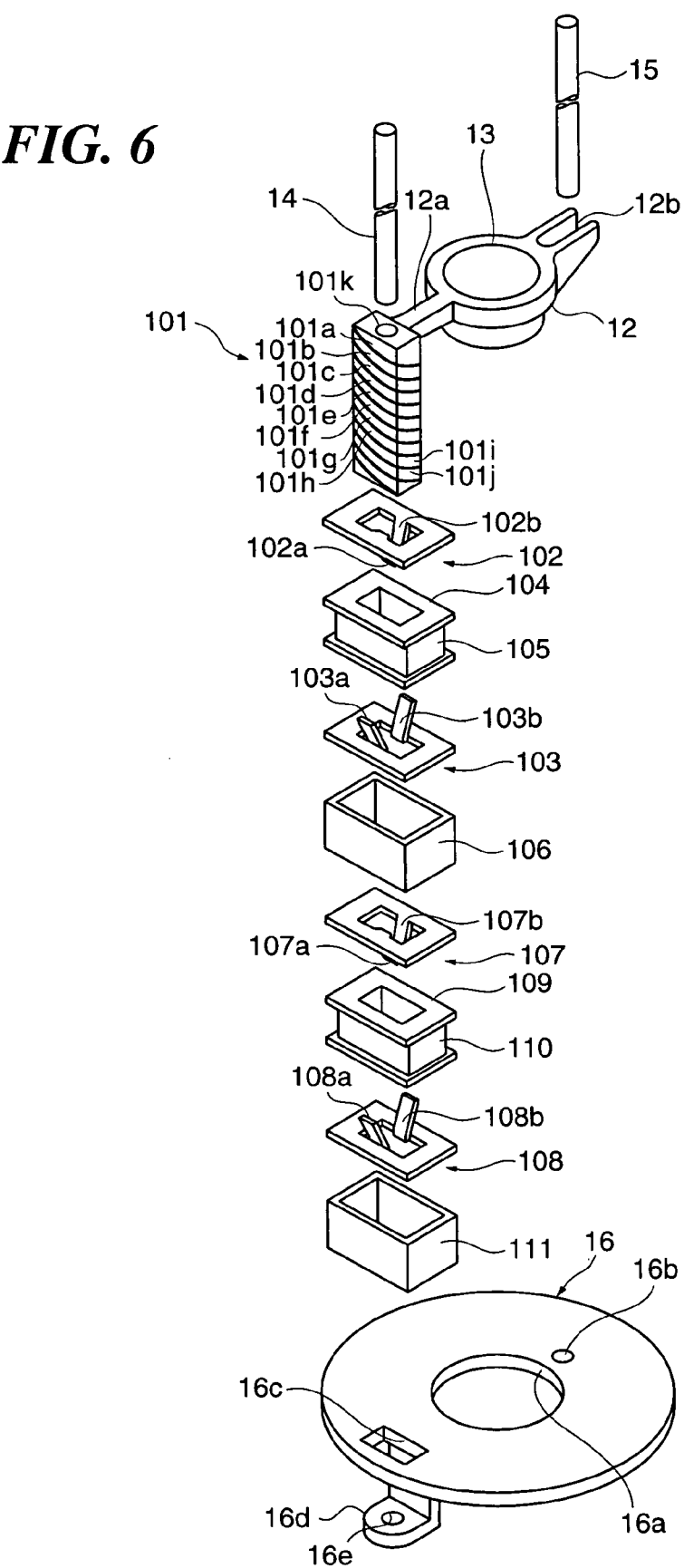
FIG. 6 is an exploded perspective view of a driving device according to a second embodiment of the present invention.
Figure 7:
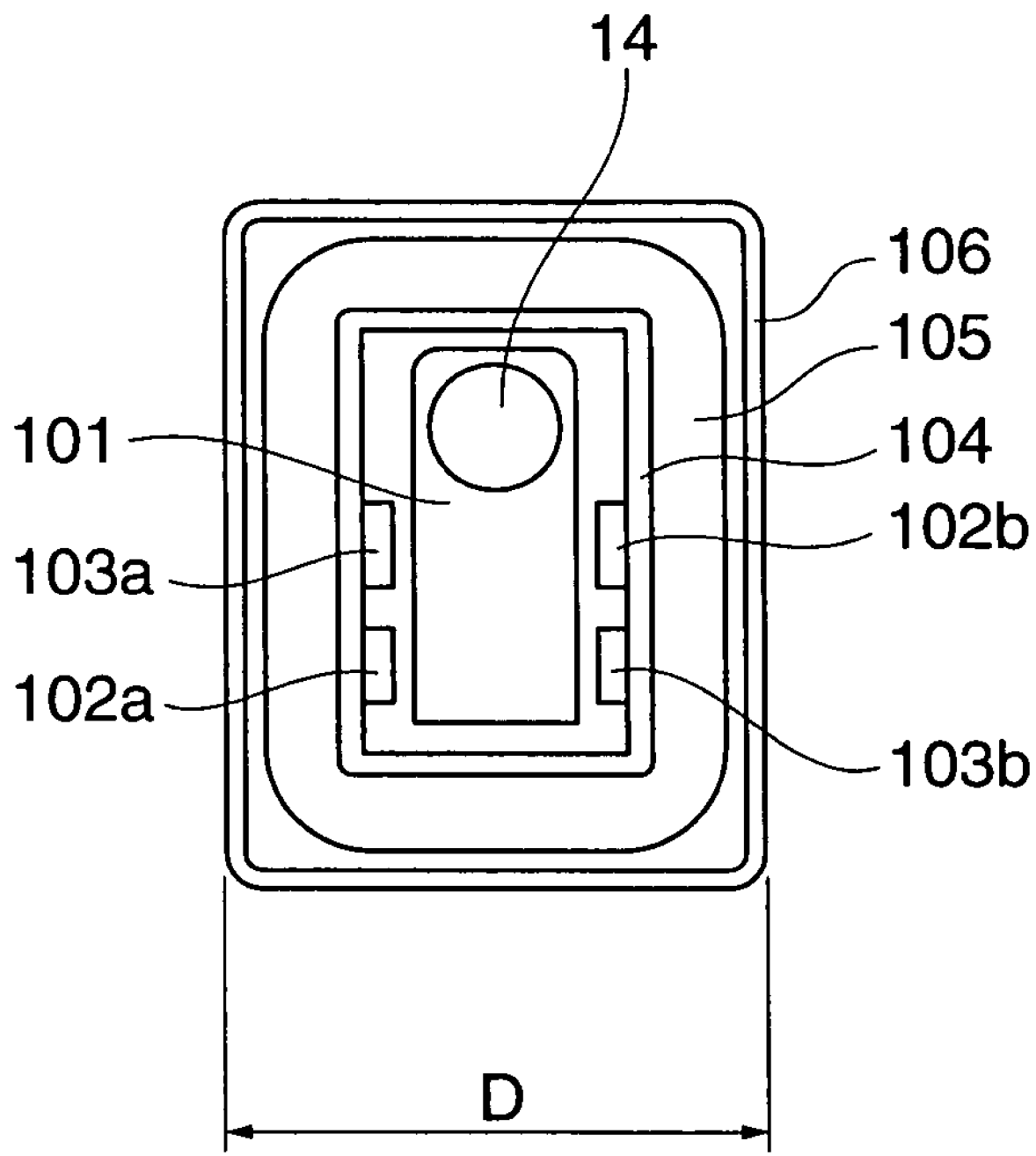
FIG. 7 is a transverse cross-sectional view of essential parts of the driving device.

FIG. 6 is an exploded perspective view of a driving device according to the second embodiment, and FIG. 7 is a transverse cross-sectional view of essential parts of the driving device.

The present embodiment is distinguished from the first embodiment in that a magnet having a shape of a quadrangular prism, i.e. a rectangular transverse cross-section, is used. In the present embodiment, elements and parts corresponding to those of the first embodiment are designated by identical reference numerals, and description thereof is omitted.

As shown in FIG. 6, the driving device of the present embodiment is comprised of the quadrangular prism-shaped magnet 101, a first yoke 102, a second yoke 103, a third yoke 107, and a fourth yoke 108, each yoke having a rectangular plate-like shape. The magnet 101 has an outer peripheral surface thereof formed with a plurality of magnetized parts 101a, 101b, 101c, 101d, 101e, 101f, 101g, 101h, 101i, and 101j. The magnetized parts 101a to 101j spirally extend along the outer peripheral surface of the magnet 101 and adjacent to one another. Among the magnetized parts 101a to 101j, the magnetized parts 101a, 101c, 101e, 101g, and 101i are S magnetized, while the magnetized parts 101b, 101d, 101f, 101h, and 101j are N magnetized. In the present embodiment, the magnet 101 has ten magnetized parts, but the number of magnetized parts (poles) is not limited to ten.

The magnet 101 has a hollow part 101k (guide part) axially formed therethrough and having a circular transverse cross-section, and the guide bar 14 is slidably fitted in the hollow part 101k. Thus, the magnet 101 is supported such that it can move along its axis while being guided by the guide bar 14.

The first yoke 102 is formed of a soft magnetic material, and has two spiral magnetic pole teeth 102a and 102b. The magnetic pole teeth 102a and 102b are opposed to respective corresponding ones of the magnetized parts of the magnet 101. Further, the magnetic pole teeth 102a and 102b are the same in phase with each other with respect to the polarity of respective opposed corresponding ones of the magnetized parts of the magnet.

The second yoke 103 is formed of a soft magnetic material, and has two spiral magnetic pole teeth 103a and 103b. The magnetic pole teeth 103a and 103b are opposed to respective corresponding ones of the magnetized parts of the magnet 101. Further, the magnetic pole teeth 103a and 103b are the same in phase with each other with respect to the polarity of the respective opposed corresponding ones of the magnetized parts of the magnet. Similarly to the first embodiment, the magnetic pole teeth 103a and 103b are arranged in a manner shifted in phase from the magnetic pole teeth 102a and 102b, respectively, by a magnetization pitch thereof (the distance between the center of an S pole and that of an N pole), i.e. by $\pi$ (rad) in terms of electrical angle with respect to the magnetization phase of the magnetized parts of the magnet 1.

A first bobbin 104 is disposed between the first yoke 102 and the second yoke 103. The first bobbin 104 is formed of a non-conductive material, such as plastic, and a first coil 105 made of a lead wire is wound around the first bobbin 104. When an electric current is applied to the first coil 105, the magnetic pole teeth 102a and 102b of the first yoke 102 and the magnetic pole teeth 103a and 103b of the second yoke 103 are magnetized to have respective predetermined polarities.

The first yoke 102 and the second yoke 103 are fixed to a first outer cover 106. The first outer cover 106 is formed of a soft magnetic material. The first outer cover 106 not only covers the first bobbin 104 and the first coil 105, but also magnetically couples the first yoke 102 and the second yoke 103 to each other for relative positioning of the two yokes 102 and 103.

The first yoke 102, the second yoke 103, the first bobbin 104, the first coil 105, and the first outer cover 106 form a first stator.

The third yoke 107 is formed of a soft magnetic material, and has two spiral magnetic pole teeth 107a and 107b. The magnetic pole teeth 107a and 107b are opposed to respective corresponding ones of the magnetized parts of the magnet 101. Further, the magnetic pole teeth 107a and 107b are the same in phase with each other with respect to the polarity of the respective opposed corresponding ones of the magnetized parts of the magnet.

The fourth yoke 108 is formed of a soft magnetic material, and has two spiral magnetic pole teeth 108a and 108b. The magnetic pole teeth 108a and 108b are opposed to respective corresponding ones of the magnetized parts of the magnet 101. Further, the magnetic pole teeth 108a and 108b are the same in phase with each other with respect to the polarity of respective opposed corresponding ones of the magnetized parts of the magnet. Similarly to the first embodiment, the magnetic pole teeth 108a and 108b are arranged in a manner shifted in phase from the magnetic pole teeth 107a and 107b, respectively, by a magnetization pitch thereof (the distance between the center of an S pole and that of an N pole), i.e. by $\pi$ (rad) in terms of electrical angle with respect to respective corresponding ones of the magnetized parts of the magnet 1.

A second bobbin 109 is disposed between the third yoke 107 and the fourth yoke 108. The second bobbin 109 is formed of a non-conductive material, such as plastic, and a second coil 110 made of a lead wire is wound around the second bobbin 109. When an electric current is applied to the second coil 110, the magnetic pole teeth 107a and 107b of the third yoke 107 and the magnetic pole teeth 108a and 108b of the fourth yoke 108 are magnetized to have respective predetermined polarities.

The third yoke 107 and the fourth yoke 108 are fixed to a second outer cover 111. The second outer cover 111 is formed of a soft magnetic material. The second outer cover 111 not only covers the second bobbin 109 and the second coil 110, but also magnetically couples the third yoke 107 and the fourth yoke 108 to each other for relative positioning of the two yokes 107 and 108.

The third yoke 107, the fourth yoke 108, the second bobbin 109, the second coil 110, and the second outer cover 111 form a second stator. Similarly to the first embodiment, the second stator and the first stator are arranged in a manner shifted in phase from each by $\pi/2$ (rad) in terms of electrical angle with respect to the magnetization phase of the magnetized parts of the magnet 1.

In the present embodiment, similarly to the first embodiment, the first coil 105 and the second coil 110 are alternately energized or deenergized to switch the polarity of each of the magnetic pole teeth of the first yoke 102 and the magnetic pole teeth of the second yoke 103, whereby the magnet 101 (the lens holder 12 and the lens 13) can be moved along the guide bar 14.

According to the present embodiment configured as above, since the magnet 101 in the form of a quadrangular prism is used as shown in FIG. 7, a dimension D (the size of the magnet 101 in the diametral direction of the lens 13) can be reduced. Therefore, when the driving device of the present embodiment is incorporated e.g. in the lens barrel of a camera, the lens barrel can have a reduced diameter.

Figure 8:
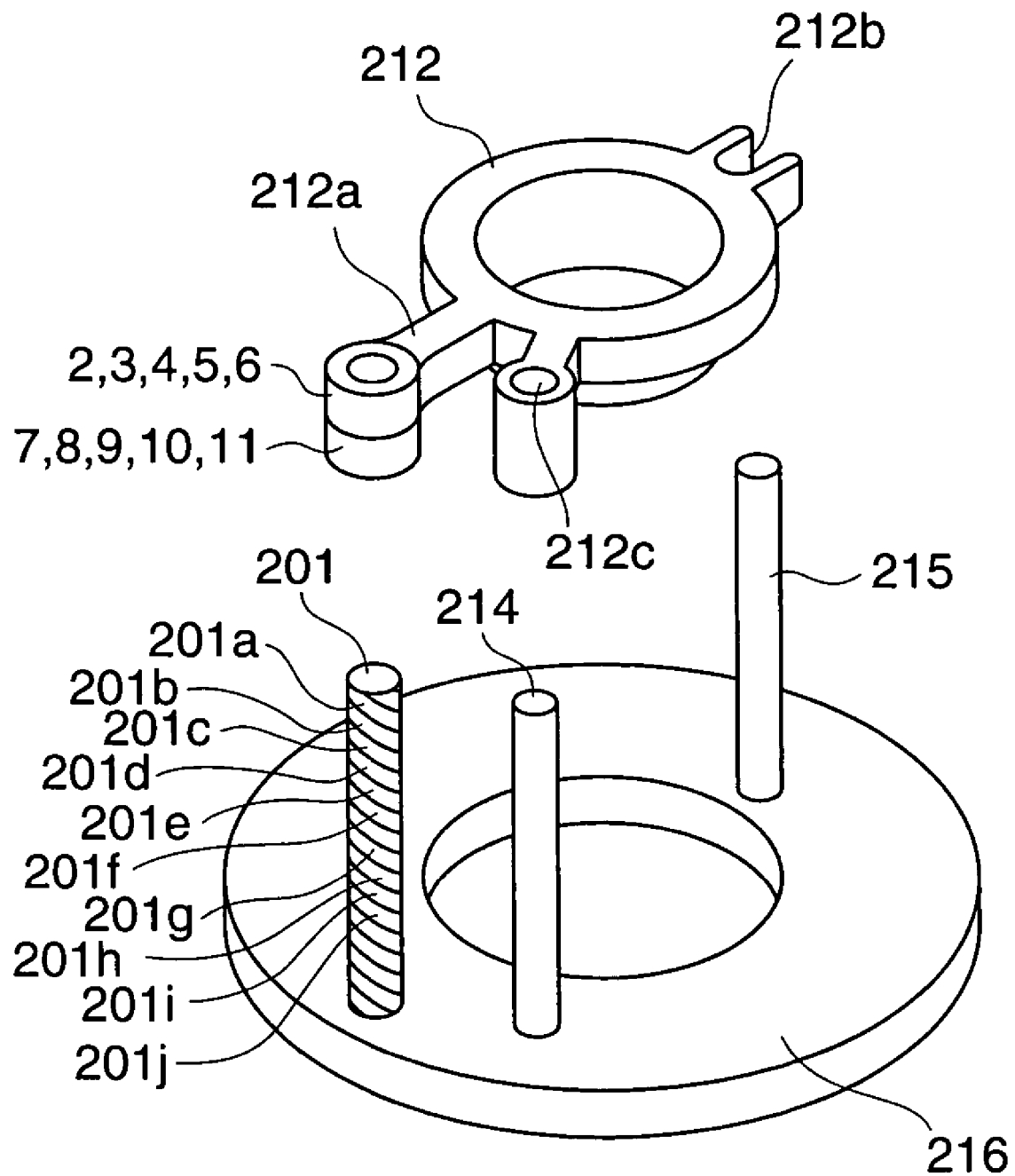
FIG. 8 is an exploded perspective view of a driving device according to a third embodiment of the present invention.

Next, a third embodiment of the present invention will be described with reference to FIG. 8. FIG. 8 is an exploded perspective view of a driving device according to the third embodiment.

As shown in FIG. 8, the present embodiment is distinguished from the first embodiment in that a magnet 201 is fixed to a base plate 216, and a first stator and a second stator are fixed to a lens holder 212. The first stator is comprised of the first yoke 2, the second yoke 3, the first bobbin 4, the first coil 5, and the first outer cover 6. The second stator is comprised of the third yoke 7, the fourth yoke 8, the second bobbin 9, the second coil 10, and the second outer cover 11.

The magnet 201 is in the form of a cylinder extending parallel with the optical axis, and has one end thereof fixed to the base plate 216. The magnet 201 has an outer peripheral surface thereof formed with a plurality of magnetized parts 201a, 201b, 201c, 201d, 201e, 201f, 201g, 201h, 201i, and 201j. The magnetized parts 201a to 201j spirally extend along the outer peripheral surface of the magnet 201 and adjacent to one another. Among the magnetized parts 201a to 201j, the magnetized parts 201a, 201c, 201e, 201g, and 201i are S magnetized, while the magnetized parts 201b, 201d, 201f, 201h, and 201j are N magnetized. In the present embodiment, the magnet 201 has ten magnetized parts, but the number of magnetized parts (poles) is not limited to ten.

A guide bar 214 and a shake preventive guide bar 215 both extending parallel with the magnet 201 are fixed to the base plate 216. As will be described hereinafter, the guide bar 214 supports the lens holder 212 such that it is movable along the optical axis. The shake preventive guide bar 215 prevents rotation of the lens holder 212 about the optical axis, as described hereinafter.

The lens holder 212 is formed with an arm 212a, a guide part 212c, and a groove 212b. The first and second stators are fixed to the arm 212a. The guide bar 214 fixed to the base plate 216 is slidably fitted in the guide part 212c, while the shake preventive guide bar 215 is slidably fitted in the groove 212b.

In the present embodiment configured as above, as is the case with the first embodiment, the first coil 5 and the second coil 10 are alternately energized, and as a consequence, electromagnetic forces are generated between the magnet 201 and the yokes 2, 3, 7, and 8 to move the magnet 201 (the lens holder 212 and the lens 13) along the guide bar 214 in the direction of the optical axis.

Therefore, according to the present embodiment, the same advantageous effects as provided by the first embodiment can be obtained.

Next, a fourth embodiment of the present invention will be described with reference to FIGS. 9 to 17.

Figure 9:
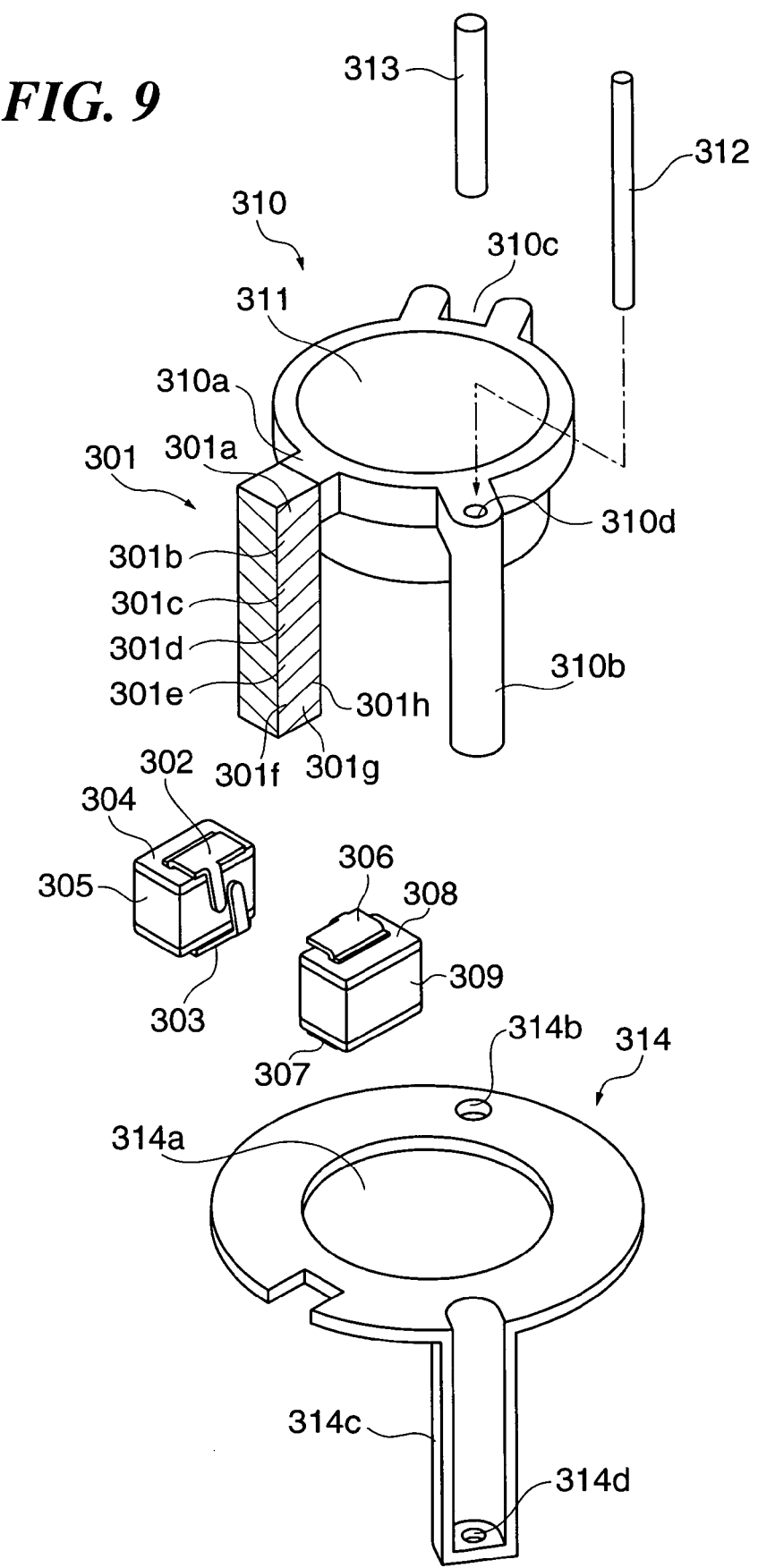
FIG. 9 is an exploded perspective view showing the construction of a lens driving device implementing a driving device according to a fourth embodiment of the present invention.
Figure 10:
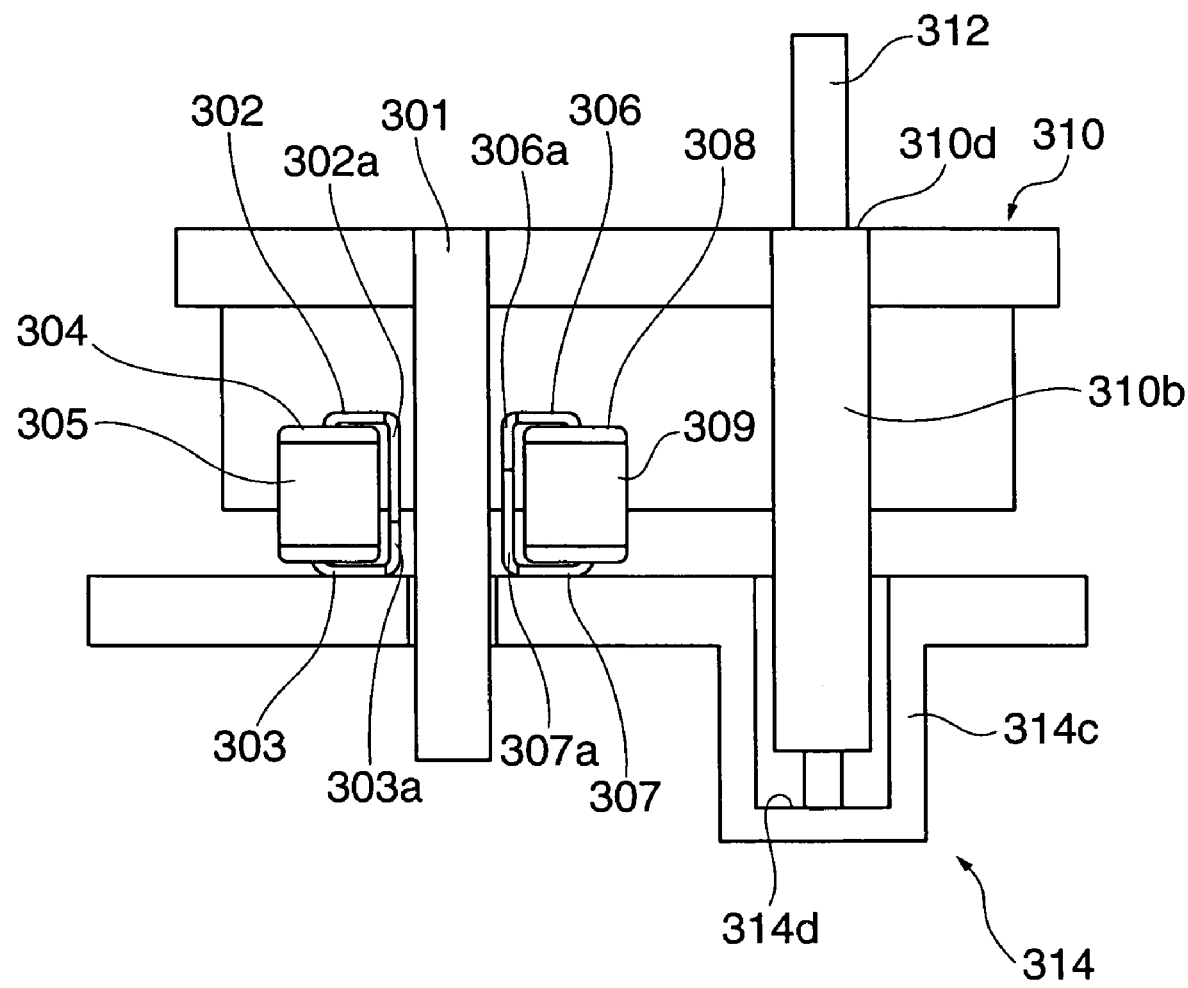
FIG. 10 is a side view showing the lens driving device of FIG. 9 in an assembled state.
Figure 11:
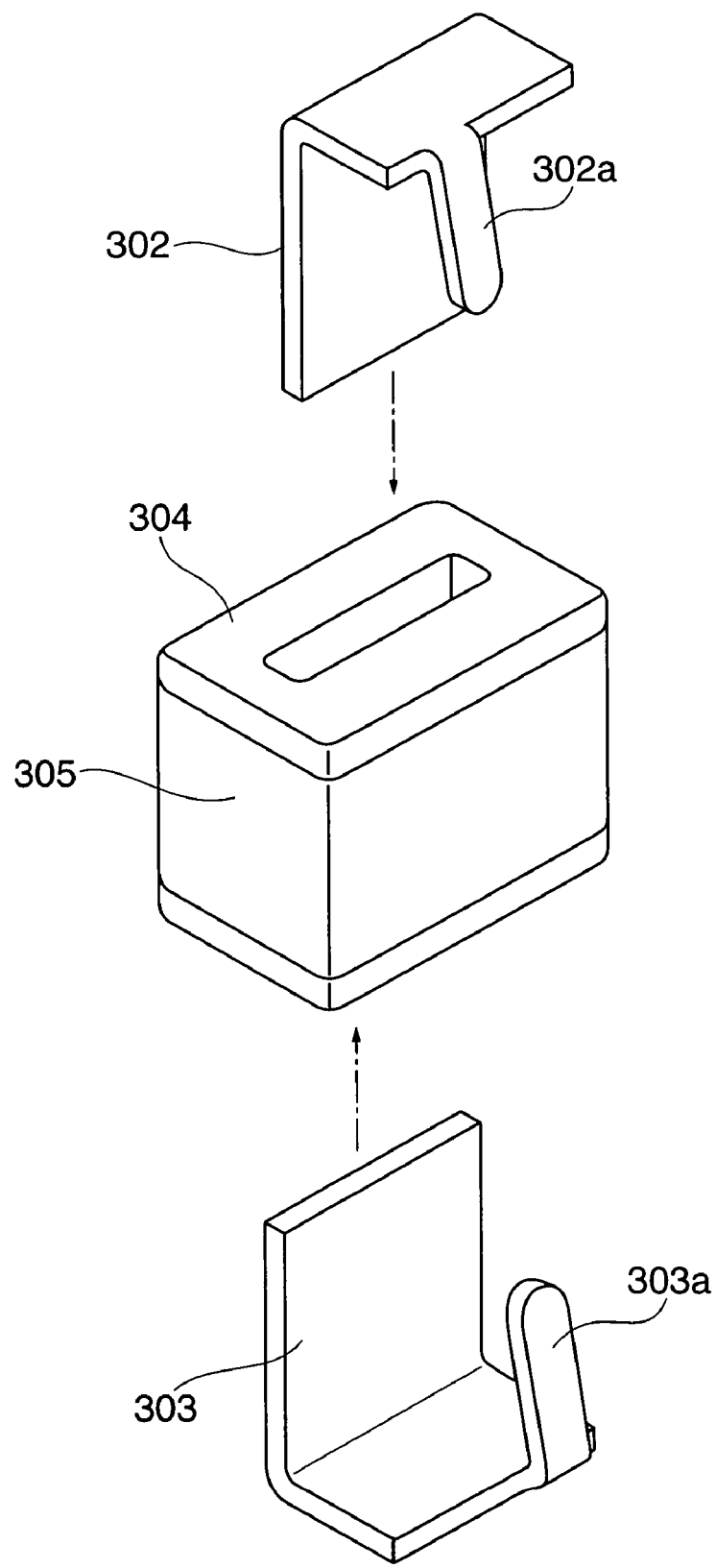
FIG. 11 is an exploded perspective view showing component parts constituting a first stator unit of the lens driving device.
Figure 12:
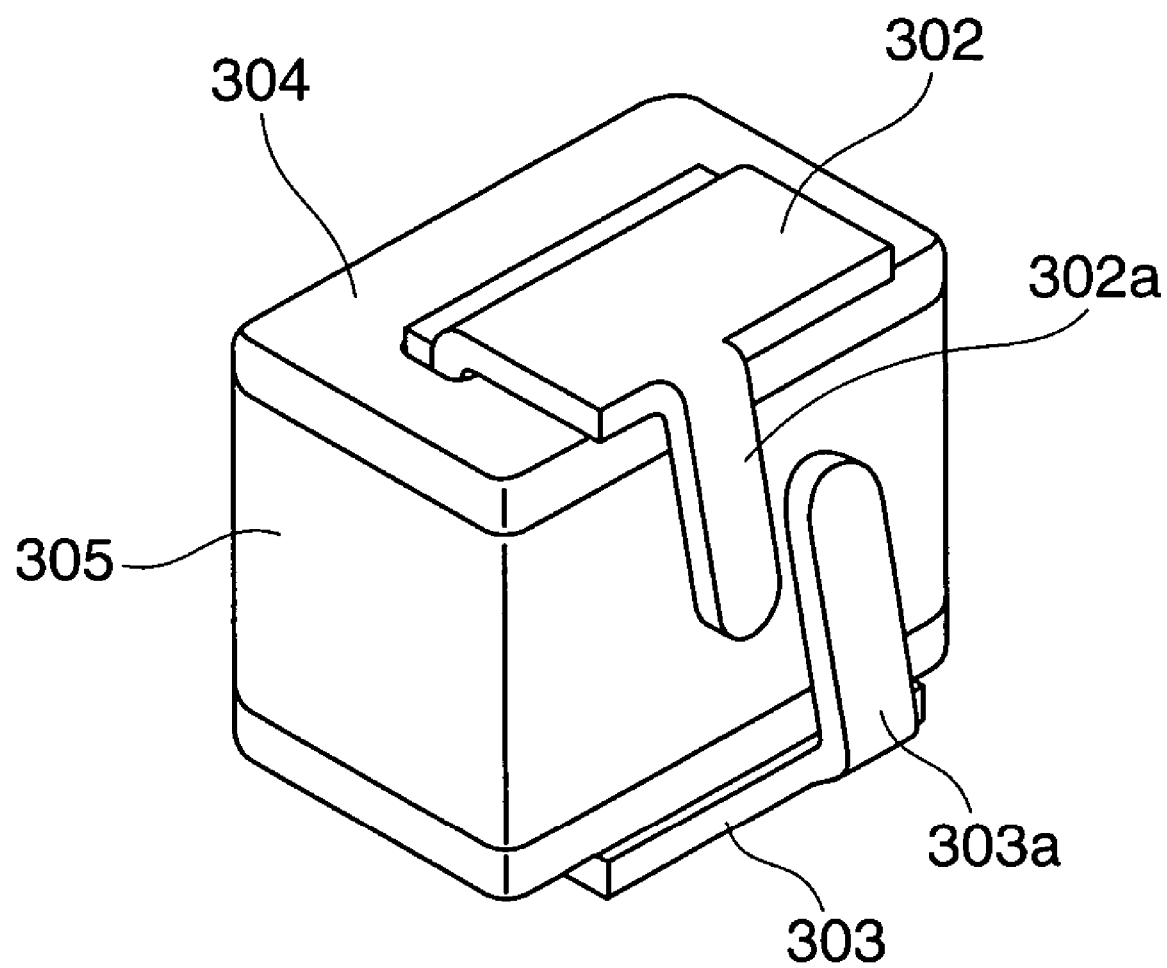
FIG. 12 is a perspective view showing the first stator unit of FIG. 11 in an assembled state.
Figure 13:
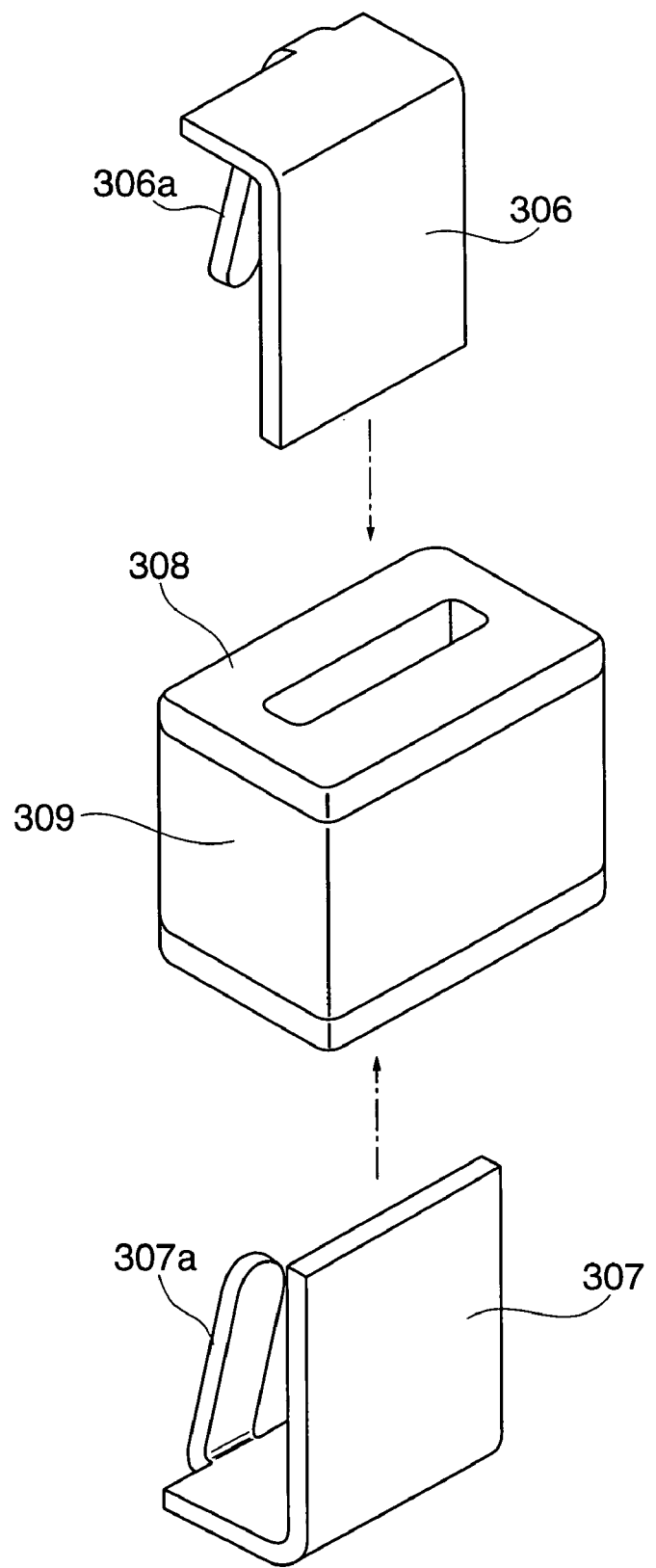
FIG. 13 is an exploded perspective view showing component parts constituting a second stator unit of the lens driving device.
Figure 14:
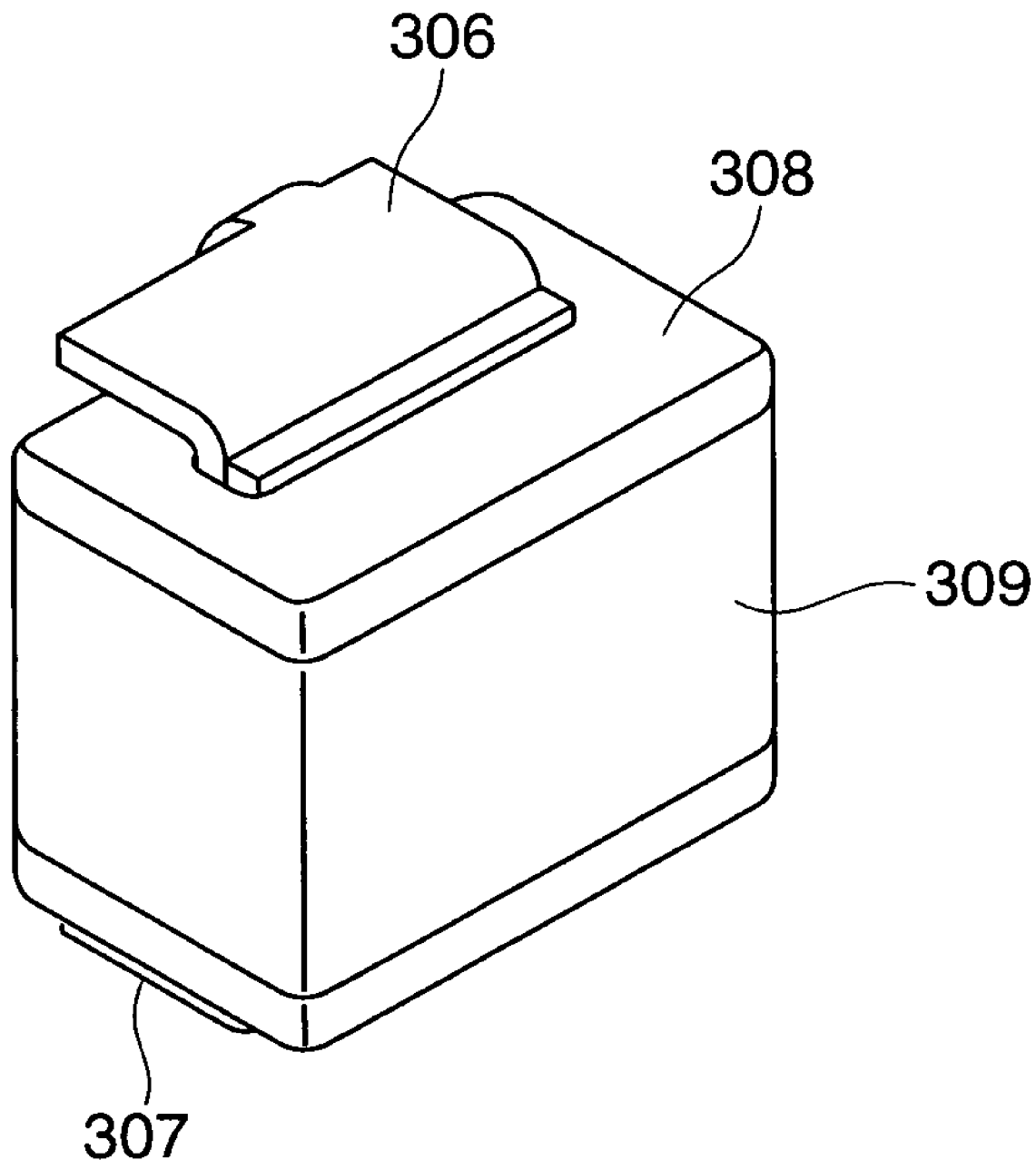
FIG. 14 is a perspective view showing the second stator unit of FIG. 13 in an assembled state.
Figure 15:
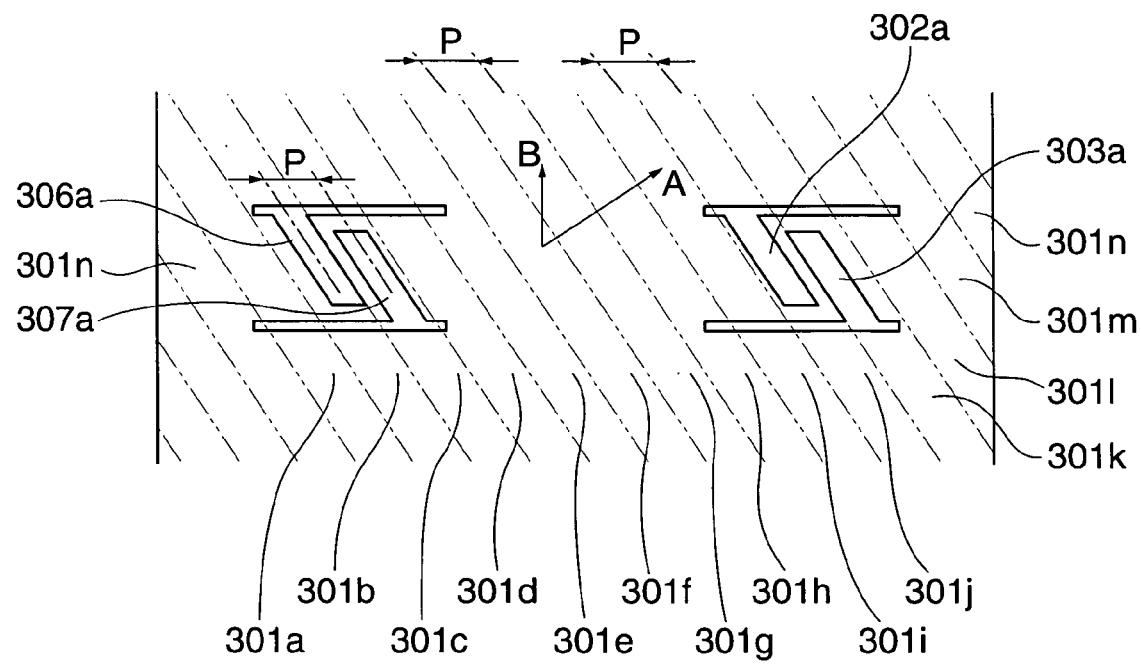
FIG. 15 is a developed plan view showing the relationship between first and second yokes of the respective first and second stator units and a magnet.

FIG. 9 is an exploded perspective view showing the construction of a lens driving device as a driving device according to the present embodiment, and FIG. 10 is a side view showing the lens driving device in an assembled state. FIG. 11 is an exploded perspective view showing component parts constituting a first stator unit, and FIG. 12 a perspective view showing the first stator unit in an assembled state. FIG. 13 is an exploded perspective view showing component parts constituting a second stator unit, and FIG. 14 a perspective view showing the second stator unit in an assembled state. FIG. 15 is a developed plan view showing the relationship between respective first and second yokes of the first and second stator units, and a magnet.

The lens driving device in FIGS. 9 to 15 is comprised of the magnet 301, the first stator unit formed of the first yoke 302, the second yoke 303, a first bobbin 304, and a first coil 305, the second stator unit formed of a third yoke 306, a fourth yoke 307, a second bobbin 308, and a second coil 309, a lens holder 310, and a base plate 314.

The magnet 301 is in the form of a rectangular parallelepiped, and has an outer peripheral surface thereof formed with a plurality of magnetized parts 301a, 301b, 301c, 301d, 301e, 301f, 301g, 301h, 301i, 301j, 301k, 301l, 301m, and 301n. Although in the following description, it is assumed that the magnet 301 has the magnetized parts 301a to 301n, the number of magnetized parts is not limited to 14 (a to n). The magnetized parts 301a to 301n spirally extend along the outer peripheral surface of the magnet 301 and adjacent to one another (see FIG. 15). The magnetized parts 301a, 301c, 301e, 301g, 301i, 301k, and 301m are S magnetized, while the magnetized parts 301b, 301d, 301f, 301h, 301j, 301l, and 301n are N magnetized, for example. In short, the magnetized parts 301a to 301n are magnetized so as to provide alternately different poles.

The first yoke 302 is formed of a soft magnetic material, and has a spiral magnetic pole tooth 302a which is opposed to a corresponding one of the spirally magnetized parts 301a to 301n on the outer peripheral surface of the magnet 301 (see FIG. 15). The first yoke 302 is inserted and fixed in a space part of the first bobbin 304, referred to hereinafter. The magnetic pole tooth 302a has a flat plate shape and extends in the same direction as a direction in which the magnetized parts 301a to 301n of the magnet 301 are spirally formed.

The second yoke 303 is formed of a soft magnetic material, and has a spiral magnetic pole tooth 303a which is opposed to a corresponding one of the spirally magnetized parts 301a to 301n on the outer peripheral surface of the magnet 301 (see FIG. 15). The second yoke 303 is also inserted and fixed in the space part of the first bobbin 304, referred to hereinafter. The magnetic pole tooth 303a has a flat plate shape and extends in the same direction as a direction in which the magnetized parts 301a to 301n of the magnet 301 are spirally formed.

The first bobbin 304 is formed of a non-conductive material (e.g. plastic). The first bobbin 304 is formed therein with the space part in which the respective flat plate parts of the first and second yokes 302 and 303 can be inserted. Further, the first bobbin 304 has an outer periphery formed as a winding part around which the first coil 305 is wound. The first yoke 302 and the second yoke 303 are inserted into the space part of the first bobbin 304 from respective opposite directions and fixed in the same (see FIGS. 11 and 12).

The first coil 305 is formed by a lead wire wound around the first bobbin 304. When the first coil 305 is energized, the magnetic pole tooth 302a of the first yoke 302 and the magnetic pole tooth 303a of the second yoke 303 are magnetized to have respective predetermined polarities. In the present embodiment, the magnetic pole tooth 302a of the first yoke 302 and the magnetic pole tooth 303a of the second yoke 303 are positioned in a manner shifted in phase from each other by the magnetization pitch P of the magnet 301, as shown in FIG. 15.

The first yoke 302, the second yoke 303, the first bobbin 304, and the first coil 305 form the first stator unit, as described hereinbefore.

The third yoke 306 is formed of a soft magnetic material, and has a spiral magnetic pole tooth 306a which is opposed to a corresponding one of the spirally magnetized parts 301a to 301n on the outer peripheral surface of the magnet 301 (see FIG. 15). The third yoke 306 is inserted and fixed in a space part of the second bobbin 308, referred to hereinafter. The magnetic pole tooth 306a has a flat plate shape and extends in the same direction as a direction in which the magnetized parts 301a to 301n of the magnet 301 are spirally formed.

The fourth yoke 307 is formed of a soft magnetic material, and has a spiral magnetic pole tooth 307a which is opposed to a corresponding one of the spirally magnetized parts 301a to 301n on the outer peripheral surface of the magnet 301 (see FIG. 15). The fourth yoke 307 is also inserted and fixed in the space part of the second bobbin 308, referred to hereinafter. The magnetic pole tooth 307a has a flat plate shape and extends in the same direction as a direction in which the magnetized parts 301a to 301n of the magnet 301 are spirally formed.

The second bobbin 308 is formed of a non-conductive material (e.g. plastic). The second bobbin 308 is formed therein with the space part in which the respective flat plate parts of the third and fourth yokes 306 and 307 can be inserted. Further, the second bobbin 308 has an outer periphery formed as a winding part around which the second coil 309 is wound. The third yoke 306 and the fourth yoke 307 are inserted into the space part of the second bobbin 308 from respective opposite directions and fixed in the same (see FIGS. 13 and 14).

The second coil 309 is formed by a lead wire wound around the second bobbin 308. When the second coil 309 is energized, the magnetic pole tooth 306a of the third yoke 306 and the magnetic pole tooth 307a of the fourth yoke 307 are magnetized to have respective predetermined polarities. In the present embodiment, the magnetic pole tooth 306a of the third yoke 306 and the magnetic pole tooth 307a of the fourth yoke 307 are positioned in a manner shifted in phase from each other by the magnetization pitch P of the magnet 301, as shown in FIG. 15.

The third yoke 306, the fourth yoke 307, the second bobbin 308, and the second coil 309 form the second stator unit, as described hereinbefore.

As shown in FIG. 10, the first stator unit and the second stator unit are fixed to the base plate 314 in a manner sandwiching the magnet 301, with the magnetic pole teeth 302a, 303a, 306a, and 307a of the two stator units opposed to the magnet 301. In short, the magnet 301 is disposed between the first stator unit and the second stator unit.

Further, as shown in FIG. 15, the magnetic pole teeth of the first stator unit and the second stator unit are arranged in a manner shifted in phase from each other with respect to the magnetization phase of the magnetized parts of the magnet 301 by 90 degrees in terms of electrical angle, and shifted in position from by P×(2n+1)/2 in terms of mechanical position, in which P represents the magnetization pitch, and n represents an arbitrary integer. In FIG. 15, the magnetized parts 301a to 301n of the magnet 301 are indicated by two-dot chain lines.

The lens holder 310 is comprised of a main body formed into a shape having an inner diameter part in which a lens 311 can be fitted, an arm 310a, a guide part 310b, and a groove 310c. The arm 310a projects radially outward from the main body of the lens holder 310. The arm 310a is secured to the magnet 301, whereby the lens holder 310 is integrally combined with the magnet 301. The guide part 310b projects radially outward from the main body of the lens holder 310 and extends in the axial direction. The guide part 310b is formed therein with a through hole 310d through which a guide bar 312 is slidably fitted.

The lens 311 is rigidly fitted in the inner diameter part of the main body of the lens holder 310 and is used for photographing by an image pickup apparatus (not shown) incorporating the lens driving device of the present embodiment.

As shown in FIG. 10, the guide bar 312 is axially movably fitted through the through hole 310d of the guide part 310b of the lens holder 310, with one axial end thereof rigidly fitted in a hole 314d formed in an arm 314c of the base plate 314, referred to hereinafter. The guide bar 312 guides the lens holder 310 such that the lens holder 310 can slide parallel with the optical axis.

A shake preventive guide bar 313 is slidably fitted in the groove 310c of the lens holder 310, with one axial end thereof rigidly fitted in a hole 314b formed in an main body of the base plate 314. The shake preventive guide bar 313 prevents rotation of the lens holder 310 about the guide bar 312.

The main body of the base plate 314 is formed into a general annular shape. Further, the base plate 314 is comprised of an opening 314a, the hole 314b, the arm 314c, and the hole 314d. As shown in FIG. 10, the base plate 314 has the first stator unit and the second stator unit secured thereto. The opening 314a passes light transmitted through the lens 311. The light having passed through the opening 314a is guided to a predetermined position. The shake preventive guide bar 313 is fixedly inserted in the hole 314b formed in the main body of the base plate 314. The arm 314c axially extends from the main body of the base plate 314, and has a semi-circular shape in cross section which enables the guide part 310b of the lens holder 310 to be disposed therein with a slight gap. The guide bar 312 is fixedly inserted in the hole 314d formed in the arm 314c.

As stated above, the guide bar 312 is axially slidably fitted through the through hole 310d of the guide part 310b of the lens holder 310, with the axial end thereof rigidly fitted in the hole 314d of the base plate 314. This enables the lens holder 310 to slide relative to the base plate 314 via the guide bar 312 in the direction parallel with the optical axis. Further, the shake preventive guide bar 313 is slidably fitted in the groove 310c of the lens holder 310, with the axial end thereof rigidly fitted in the hole 314b of the base plate 314. This enables the lens holder 310 and the lens 311 to move only along the optical axis without rotating about the guide bar 312.

Next, the operation of the lens driving device of the present embodiment constructed as above will be described with reference to FIGS. 9 to 17.

As stated above, among the magnetized parts 301a to 301n of the magnet 301, the magnetized parts 301a, 301c, 301e, 301g, 301i, 301k, and 301m are S magnetized, while the magnetized parts 301b, 301d, 301f, 301h, 301j, 301l, and 301n are N magnetized. First, it is assumed that the second coil 309 is energized such that the magnetic pole tooth 306a of the third yoke 306 is S magnetized, and the magnetic pole tooth 307a of the fourth yoke 307 is N magnetized.

Energization of the second coil 309 is interrupted in this state, and at the same time the first coil 305 is energized such that the magnetic pole tooth 302a of the first yoke 302 is N magnetized, and the magnetic pole tooth 303a of the second yoke 303 is S magnetized. Then, an electromagnetic force acting in a direction indicated by an arrow A is generated in the magnet 301 as shown in FIG. 15. It can be considered that the electromagnetic force acting in the direction indicated by the arrow A is comprised of a component acting in a direction of rotating the magnet 301 and a component acting along the axis of the magnet 301.

As stated above, the shake preventive guide bar 313 prevents the lens holder 310 fixed to the magnet 301 from rotating about the guide bar 312, so that even when the component of the electromagnetic force generated in the direction indicated by the arrow A, which acts in the direction of rotating the magnet 301, is applied to the magnet 301, the magnet 301 is not rotated, but the lens holder 310, the lens 311, and the magnet 301 are moved along the guide bar 312 by an electromagnetic force acting in a direction indicated by an arrow B in FIG. 15. The magnet 301 is moved upward as viewed in FIG. 15, i.e. in the direction indicated by the arrow B, and is stopped at a position where the magnetized part 301i is opposed to the magnetic pole tooth 302a of the first yoke 302.

Then, energization of the first coil 305 is interrupted in this state, and at the same time the second coil 309 is energized such that the magnetic pole tooth 306a of the third yoke 306 is N magnetized, and the magnetic pole tooth 307a of the fourth yoke 307 is S magnetized. Then, electromagnetic force acting in the direction indicated by the arrow A is generated again in the magnet 301. In this case as well, the magnet 301 is not rotated by a component of the electromagnetic force generated in the direction indicated by the arrow A, which acts in the direction of rotating the magnet 301, but the magnet 301, the lens holder 310, and the lens 311 are moved along the guide bar 312 by a component of the electromagnetic force, which acts in the direction indicated by the arrow B. The magnet 301 is moved upward as viewed in FIG. 15, i.e. in the direction indicated by the arrow B, and is stopped at a position where the magnetized part 301a is opposed to the magnetic pole tooth 306a of the third yoke 306.

Then, energization of the second coil 309 is interrupted in this state, and at the same time the first coil 305 is energized such that the magnetic pole tooth 302a of the first yoke 302 is S magnetized, and the magnetic pole tooth 303a of the second yoke 303 is N magnetized. Then, an electromagnetic force acting in the direction indicated by the arrow A is generated again in the magnet 301. In this case as well, the magnet 301 is not rotated by a component of the electromagnetic force generated in the direction indicated by the arrow A, which acts in the direction of rotating the magnet 301, but the magnet 301, the lens holder 310, and the lens 311 are moved along the guide bar 312 by a component of the electromagnetic force, which acts in the direction indicated by the arrow B.

The magnet 301 is moved upward as viewed in FIG. 15, i.e. in the direction indicated by the arrow B, and is stopped at a position where the magnetized part 301h is opposed to the magnetic pole tooth 302a of the first yoke 302.

Further, energization of the first coil 305 is interrupted in this state, and at the same time the second coil 309 is energized such that the magnetic pole tooth 306a of the third yoke 306 is S magnetized, and the magnetic pole tooth 307a of the fourth yoke 307 is N magnetized. Then, an electromagnetic force acting in the direction indicated by the arrow A is generated again in the magnet 301. In this case as well, the magnet 301 is not rotated by a component of the electromagnetic force generated in the direction indicated by the arrow A, which acts in the direction of rotating the magnet 301, but the magnet 301, the lens holder 310, and the lens 311 are moved along the guide bar 312 by a component of the electromagnetic force, which acts in the direction indicated by the arrow B. The magnet 301 is moved upward as viewed in FIG. 15, i.e. in the direction indicated by the arrow B, and is stopped at a position where the magnetized part 301n is opposed to the magnetic pole tooth 306a of the third yoke 306.

To drive the magnet 301, the lens holder 310, and the lens 311 in the opposite direction to the direction indicated by the arrow B, the first coil 305 and the second coil 309 are only required to be alternately energized or deenergized in a sequence reverse to the above described sequence.

As described above, in the present embodiment, the first coil 305 and the second coil 309 are alternately energized or deenergized to switch the polarity of each of the magnetic pole tooth 302a of the first yoke 302, the magnetic pole tooth 303a of the second yoke 303, the magnetic pole tooth 306a of the third yoke 306, and the magnetic pole tooth 307a of the fourth yoke 307, whereby the magnet 301, the lens holder 310, and the lens 311 can be moved only in the direction indicated by the arrow B or in the opposite direction.

Further, in the present embodiment, it is possible to carry out micro-step control such that the magnet 1 is stopped at a position corresponding to the magnitude of magnetic forces generated by the first coil 305 and the second coil 309, by controlling the magnitude of electric currents to be applied to the first coil 305 and the second coil 309. According to this micro-step control, the magnet 301 is stably held in a position where it is attracted by the two-phase coils, so that the lens 311 can be positioned more stably and accurately than by the conventional method using a voice coil actuator including a one-phase coil.

As described hereinbefore, the conventional lens driving device of the type which drives the lens along the optical axis by rotating a lead screw by a stepping motor to move forward and backward a member functioning as a female thread in mesh with the lead screw suffers from the problems that sliding noise is generated due to the engagement of the lead screw and the member as the female thread, and that it takes time to move the lens to a desired position due to a small pitch of the lead screw.

In contrast, in the present embodiment, the lens holder 310 and the lens 311 are moved along the optical axis by alternately energizing or deenergizing the first coil 305 and the second coil 309 to switch the polarity of each of the magnetic pole teeth 302a to 307a of the first to fourth yokes 302 to 307. As a result, it is possible to achieve excellent quietness and high-speed driving of the lens 311.

Further, in the present embodiment, each of the magnetic pole tooth 302a of the first yoke 302, the magnetic pole tooth 303a of the second yoke 303, the magnetic pole tooth 306a of the third yoke 306, and the magnetic pole tooth 307a of the fourth yoke 307 has a flat plate shape and extends along the corresponding one of the spiral magnetized parts 301a to 301n on the outer peripheral surface of the magnet 301.

Figure 16:
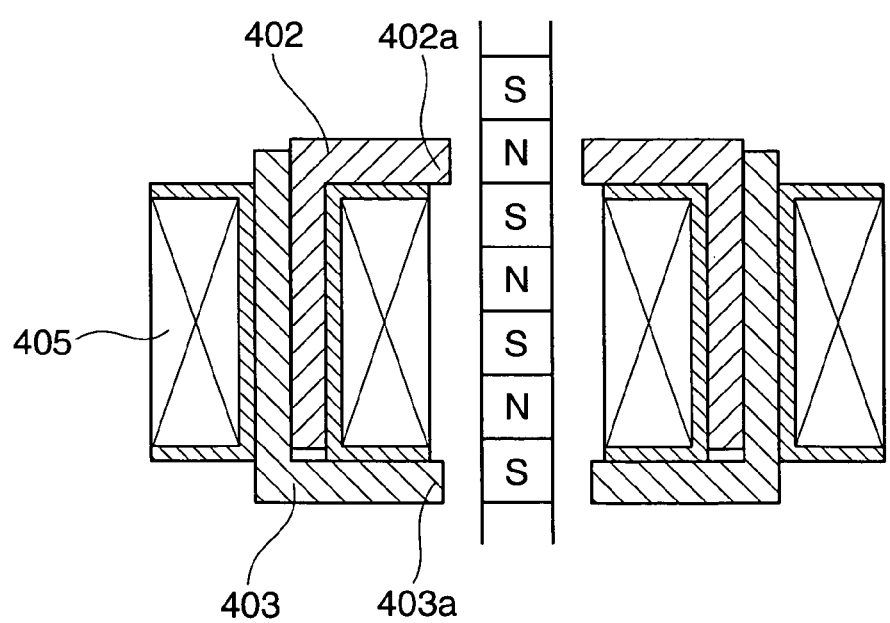
FIG. 16 is a cross-sectional view showing the construction of a comparative example of the lens driving device.

Now, let it be supposed that the magnet is not spirally magnetized, but as shown in FIG. 16, the magnet is magnetized such that S poles and N poles are alternately arranged in a direction parallel with the optical axis. In FIG. 16, a first yoke is designated by reference numeral 402, a second yoke by 403, a coil for magnetizing the yokes 402 and 403 by 405, a magnetized part of the first yoke 402 by 402a, and a magnetized part of the second yoke 403 by 403a. In this case, the magnetized parts 402a and 403a are spaced apart from each other, which increase the magnetic resistance of the magnetic circuit, leading to a reduced output of the lens driving device.

Figure 17:
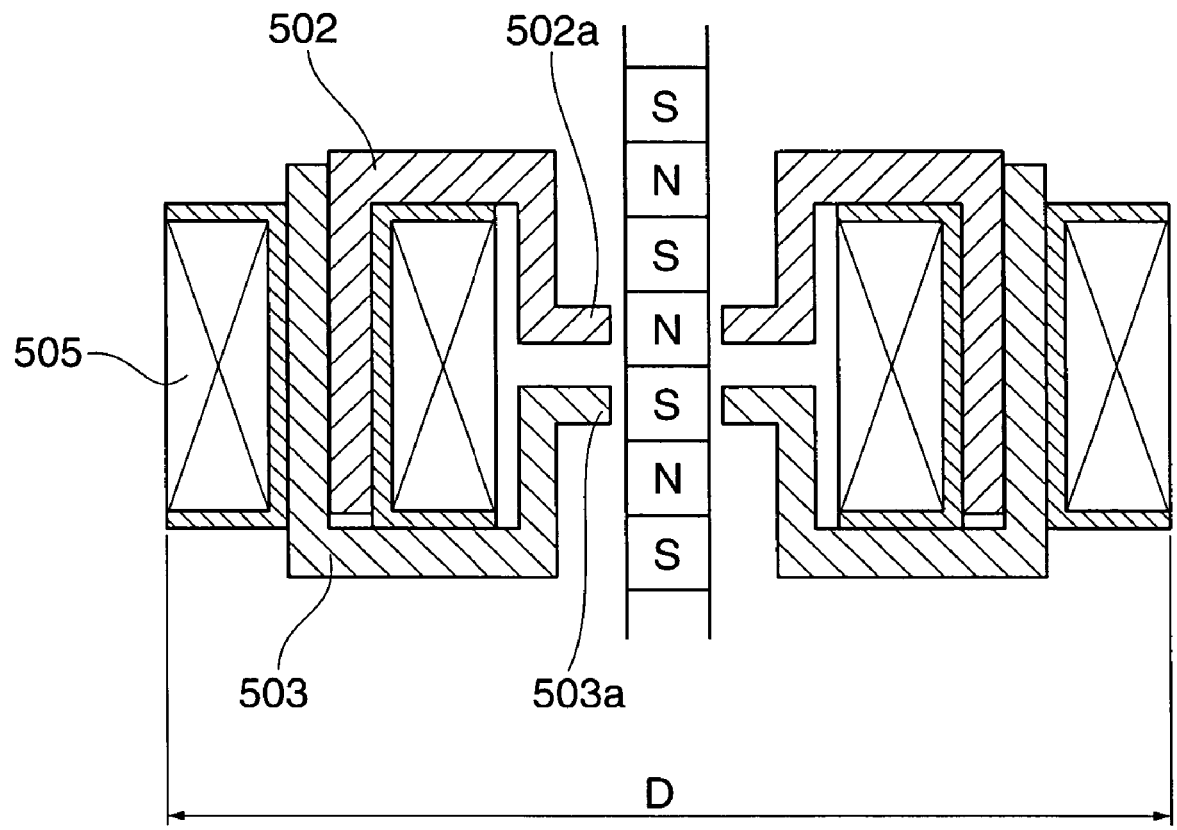
FIG. 17 is a cross-sectional view showing the construction of another comparative example of the lens driving device.

Alternatively, let it be supposed that a stator form is employed in which magnetized parts are formed as projections, as shown in FIG. 17, so as to make the magnetized parts closer to each other. In FIG. 17, a first yoke is designated by reference numeral 502, a second yoke by 503, a coil for magnetizing the yokes by 505, a magnetized part of the first yoke 502 by 502a, and a magnetized part of the second yoke 503 by 503a. In this case, the dimension D (the width of the lens driving device) increases.

To solve the above problems, in the present embodiment, the magnetized parts 301a to 301n are spirally arranged on the outer peripheral surface of the magnet 301, and each of the magnetic pole tooth 302a of the first yoke 302, the magnetic pole tooth 303a of the second yoke 303, the magnetic pole tooth 306a of the third yoke 306, and the magnetic pole tooth 307a of the fourth yoke 307 is formed into a flat plate shape and extends along the corresponding one of the spiral magnetized parts 301a to 301n on the outer peripheral surface of the magnet 301. This makes it possible to realize a lens driving device which is reduced in the dimension D (width thereof) and increased in output.

As described above, according to the present embodiment, the magnet 301 is disposed between the first and second stator units, and the magnetic pole teeth 302a to 307a of the first to fourth yokes 302 to 307 are spirally formed along the magnetized parts 301a to 301n in opposed relation thereto. Further, the guide bar 312 is axially movably fitted in the guide part 310b of the lens holder 310, with one end thereof rigidly fitted in the hole 314d of the base plate 314. The shake preventive guide bar 313 is slidably fitted in the groove 310c of the lens holder 310, with one end thereof rigidly fitted in the hole 314b of the base plate 314.

This makes it possible to provide a lens driving device which is capable of achieving reduction of zooming time during a zooming operation of the lens 311, enhancement of quietness in driving the lens 311, and stable and accurate lens positioning of the lens 311 (stability of a stop position).

Although in each of the above described embodiments, the driving device is used for driving a lens, by way of example, this is not limitative, but the present invention is applicable to the driving of a member that requires stable and accurate positioning.

Further, although in each of the above described embodiments, the shake preventive guide bar for preventing rotation of the lens holder is slidably fitted in the groove of the lens holder, by way of example, this is not limitative, but the mechanism for preventing rotation of the lens holder can have any suitable construction.

CROSS REFERENCE TO RELATED APPLICATION

This application claims priority from Japanese Patent Applications Nos. 2004-307248 filed Oct. 21, 2004, and 2005-144197 filed May 17, 2005, which are hereby incorporated by reference herein.

What is claimed is:

1. A driving device for driving an object to be driven, the driving device comprising:
    a hollow column-shaped magnet extending in a direction along a predetermined axis, the magnet having a plurality of magnetized parts spirally extending along an outer peripheral surface thereof;
    a first stator unit having a first yoke, a second yoke, and a first coil, each of the first yoke and the second yoke being formed of a soft magnetic material and having a plurality of magnetic pole teeth extending in the spiral direction, each of the magnetic pole teeth of the first and second yokes being disposed in opposed relation to a corresponding one of the magnetized parts of the magnet, the first coil magnetizing the first yoke and the second yoke, the first coil being interposed between the first yoke and the second yoke in the direction along the predetermined axis;
    a second stator unit having a third yoke, a fourth yoke, and a second coil, each of the third yoke and the fourth yoke being formed of a soft magnetic material and having a plurality of magnetic pole teeth extending in the spiral direction, each of the magnetic pole teeth of the third and fourth yokes being disposed in opposed relation to a corresponding one of the magnetized parts of the magnet, the second coil magnetizing the third yoke and the fourth yoke, the second coil being interposed between the third yoke and the fourth yoke in the direction along the predetermined axis;
    a base plate to which the first stator unit and the second stator unit are fixed in the direction along the predetermined axis;
    a holding member that holds the object to be driven and supports the magnet such that the magnet is movable in the direction along the predetermined axis with respect to the base plate; and
    a guide bar slidably fitted to a hollow part of the magnet, the guide bar guiding the magnet in the direction along the predetermined axis,
    wherein the first coil and the second coil are energized to move the holding member in the direction along the predetermined axis to thereby drive the object to be driven.

2. A driving device as claimed in claim 1, wherein the magnet is cylindrically shaped.

3. A driving device as claimed in claim 1, wherein the magnet is prism shaped.

4. A driving device for driving an object to be driven, the driving device comprising:
    a hollow prism-shaped magnet extending in a direction along a predetermined axis, the magnet having a plurality of magnetized parts spirally extending along an outer peripheral surface thereof;
    a first stator unit having a first yoke, a second yoke, and a first coil, each of the first yoke and the second yoke being formed of a soft magnetic material and having a plurality of magnetic pole teeth extending in the spiral direction, each of the magnetic pole teeth of the first and second yokes being disposed in opposed relation to a corresponding one of the magnetized parts of the magnet, the first coil magnetizing the first yoke and the second yoke, the first coil being interposed between the first yoke and the second yoke in the direction along the predetermined axis;
    a second stator unit having a third yoke, a fourth yoke, and a second coil, each of the third yoke and the fourth yoke being formed of a soft magnetic material and having a plurality of magnetic pole teeth extending in the spiral direction, each of the magnetic pole teeth of the third and fourth yokes being disposed in opposed relation to a corresponding one of the magnetized parts of the magnet, the second coil magnetizing the third yoke and the fourth yoke, the second coil being interposed between the third yoke and the fourth yoke in the direction along the predetermined axis;
    a base plate to which the first stator unit and the second stator unit are fixed in the direction along the predetermined axis; and
    a holding member that holds the object to be driven and supports the magnet such that the magnet is movable in the direction along the predetermined axis with respect to the base plate; and
    a guide bar slidably fitted to a hollow part of the magnet, the guide bar guiding the magnet in the direction along the predetermined axis,
    wherein the first and second coils are energized to move the holding member in the direction along the predetermined axis to thereby drive the object to be driven.

* * * * *